US011179968B2

(12) United States Patent
Huang et al.

(10) Patent No.: US 11,179,968 B2
(45) Date of Patent: Nov. 23, 2021

(54) TELESCOPING WHEEL ASSEMBLY AND TELESCOPING WHEEL BOX

(71) Applicant: Chang Yang Material Co., LTD., Huatan Township (TW)

(72) Inventors: Ming Hua Huang, Huatan Township (TW); Shun Fan Lee, Huatan Township (TW); Shuo Ying Lin, Huatan Township (TW); Po Wei Tsao, Huatan Township (TW)

(73) Assignee: CHANG YANG MATERIAL CO., LTD., Huatan Township (TW)

( * ) Notice: Subject to any disclaimer, the term of this patent is extended or adjusted under 35 U.S.C. 154(b) by 0 days.

(21) Appl. No.: 16/601,470

(22) Filed: Oct. 14, 2019

(65) Prior Publication Data

US 2020/0122504 A1    Apr. 23, 2020

(30) Foreign Application Priority Data

Oct. 17, 2018  (TW) .................................. 107214039
Apr. 18, 2019  (TW) .................................. 108204802
Apr. 25, 2019  (TW) .................................. 108205139

(51) Int. Cl.
*B60B 33/06*        (2006.01)
*A45C 5/14*         (2006.01)

(52) U.S. Cl.
CPC ............ *B60B 33/063* (2013.01); *A45C 5/146* (2013.01)

(58) Field of Classification Search
CPC ... Y10T 16/182; Y10T 16/193; Y10T 16/195; Y10T 16/1937; Y10T 16/196; Y10T 16/212; B60B 33/04; B60B 33/045; B60B 33/06; B60B 33/063; B60B 33/0068; B60B 33/0089; B60B 2900/131; A45C 5/14; A45C 5/146
See application file for complete search history.

(56) References Cited

U.S. PATENT DOCUMENTS

| 72,956 | A | * | 12/1867 | Youngs et al. ........ B60B 33/045 16/44 |
| 1,019,302 | A | * | 3/1912 | Butcher .................. B60B 33/06 16/32 |
| 1,875,965 | A | * | 9/1932 | Waters .................. E05C 17/446 292/73 |
| 1,906,238 | A | * | 5/1933 | Ramsey ................ B60B 33/045 16/44 |
| 2,458,922 | A | * | 1/1949 | Andresen ............... B62D 7/023 16/44 |

(Continued)

*Primary Examiner* — Chuck Y Mah
(74) *Attorney, Agent, or Firm* — Sheppard Mullin Richter & Hampton LLP

(57) ABSTRACT

A telescoping wheel assembly includes a base body, a wheel set and an elastic member. The base body includes a receiving groove. The wheel set is connected to the receiving groove and selectively positioned at an outward position or an inward position relative to the receiving groove. The wheel set includes a wheel axle and a wheel body. The wheel body is connected to an outside of the wheel axle. The elastic member is disposed in the receiving groove and abutted against the base body and the wheel set. When the wheel set is positioned at the outward position, the elastic member provides a buffering elastic force to the wheel set. When the wheel set is positioned at the inward position, the elastic member provides a pushing elastic force to the wheel set.

13 Claims, 33 Drawing Sheets

(56) References Cited

U.S. PATENT DOCUMENTS

| | | | | |
|---|---|---|---|---|
| 3,380,546 A * | 4/1968 | Rabjohn | ................. | B62B 3/001 180/15 |
| 4,103,391 A * | 8/1978 | Thomsen | ............... | A45C 5/146 16/33 |
| 5,001,808 A * | 3/1991 | Chung | .................... | B60B 33/06 16/18 CG |
| 5,873,145 A * | 2/1999 | Chou | ....................... | A45C 5/14 16/44 |
| 5,875,519 A * | 3/1999 | Chou | ................. | B60B 33/0002 16/44 |
| 6,357,077 B1 * | 3/2002 | Jones, Jr. | ............. | B60B 33/045 16/35 D |
| 6,367,602 B1 * | 4/2002 | Chang | .................... | A45C 5/146 190/18 A |
| 6,382,736 B1 * | 5/2002 | Chang | .................... | A45C 5/14 16/44 |
| 6,412,839 B1 * | 7/2002 | Tran | ....................... | A63B 47/02 16/44 |
| 6,453,140 B1 * | 9/2002 | Hsu | ..................... | H04N 1/1013 267/136 |
| 6,484,359 B1 * | 11/2002 | Guttmann | ............. | B60B 33/045 16/18 R |
| 6,769,701 B1 * | 8/2004 | Clausen | ................... | A45C 5/14 16/44 |
| 6,892,784 B2 * | 5/2005 | Maas | ....................... | A47G 5/00 16/319 |
| 7,096,533 B2 * | 8/2006 | Griepentrog | ............ | B60B 33/04 16/35 R |
| 7,195,322 B2 * | 3/2007 | Lin | ......................... | A45C 5/14 190/18 A |
| 7,356,877 B2 * | 4/2008 | Kim | .................... | B60B 33/0007 16/105 |
| 8,087,126 B2 * | 1/2012 | Duvert | ............... | B60B 33/0015 16/33 |
| 8,356,688 B2 * | 1/2013 | Passed | ..................... | B62B 5/06 180/326 |
| 9,908,353 B2 * | 3/2018 | Nakahara | .................. | B41J 3/46 |
| 2004/0226135 A1 * | 11/2004 | Wang | .................... | B60B 33/045 16/44 |
| 2008/0030067 A1 * | 2/2008 | Chen | ....................... | B60B 33/04 301/1 |

* cited by examiner

TELESCOPING WHEEL ASSEMBLY AND TELESCOPING WHEEL BOX

This application claims priority to Taiwan Application Serial Number 107214039, filed Oct. 17, 2018, Taiwan Application Serial Number 108204802, filed Apr. 18, 2019, and Taiwan Application Serial Number 108205139, filed Apr. 25, 2019, all of which are herein incorporated by reference in their entirety.

BACKGROUND

Technical Field

The present disclosure relates to a telescoping wheel assembly and telescoping wheel box. More particularly, the present disclosure relates to a telescoping wheel assembly and telescoping wheel box which buffs an external force via an elastic member.

Description of Related Art

A luggage is an essential supply in our life. However, a wheel set of a luggage is an element most susceptible to damage because the wheel set may encounter an external force during transportation, causing the wheel set to damage.

In addition, when in use, a weight of the luggage and an external force from a use environment can also cause the wheel set to suffer damages. This is because when the luggage is dragged, the wheel set of the luggage endures the weight of the luggage and the external force from the use environment.

Hence, a new wheel set for luggage that can endure extensive wear and tear during its use life is considered.

SUMMARY

According to one aspect of the present disclosure, a telescoping wheel assembly includes a base body, a wheel set and an elastic member. The base body includes a receiving groove. The wheel set is connected to the receiving groove and selectively positioned at an outward position or an inward position relative to the receiving groove. The wheel set includes a wheel axle and a wheel body. The wheel body is connected to an outside of the wheel axle. The elastic member is disposed in the receiving groove and abutted against the base body and the wheel set. When the wheel set is positioned at the outward position, the elastic member provides a buffering elastic force to the wheel set. When the wheel set is positioned at the inward position, the elastic member provides a pushing elastic force to the wheel set.

According to another aspect of the present disclosure, a telescoping wheel box includes the telescoping wheel assembly, a frame portion, a first outer body, a first inner body, a second outer body and a second inner body. The frame portion includes an outer frame portion and an inner frame portion. The outer frame portion includes a first outer frame and a second outer frame. The second outer frame is detachably connected to the first outer frame. The inner frame portion is movably connected to the outer frame portion and includes a first inner frame and a first inner frame. The first inner frame is movably connected to the first outer frame. The second inner frame is movably connected to the second outer frame. The first outer body is disposed in the first outer frame and connected to the telescoping wheel assembly. The first inner body is disposed in the first inner frame. The second outer body is disposed in the second outer frame and connected to the telescoping wheel assembly. The second inner body is disposed in the second inner frame.

According to further another aspect of the present disclosure, a telescoping wheel assembly includes a base body, a wheel set, at least one elastic member and a button. The base body includes a receiving groove and an extending groove. The extending groove is communicated to the receiving groove. The wheel set is disposed in the receiving groove and selectively positioned at an outward position or an inward position relative to the receiving groove, and includes an adjusting element, a wheel axle and a wheel body. The adjusting element is disposed in the receiving groove. The wheel axle is disposed on the adjusting element. The wheel body is connected to the wheel axle. The at least one elastic member is disposed in receiving groove and abutted against the adjusting element. When the wheel set is positioned at the outward position, the at least one elastic member provides a telescoping elastic force. The button is movably disposed at the wheel set and extended to the base body. The button is operated in one of a protruding status and an adducting status, when the button is adjusted from the adducting status to the protruding status, the button is clasped to the extending groove; when the button is adjusted from the protruding status to the adducting status, the wheel set is adjusted from the outward position to the inward position by the at least one elastic member.

According to still further another aspect of the present disclosure, a telescoping wheel assembly includes a base body, a wheel set, a pivoting axle, an elastic member and a positioning element. The base body includes a receiving groove. The wheel set is disposed in the receiving groove and selectively positioned at an outward position or an inward position relative to the receiving groove, and includes a wheel axle, a wheel base and a wheel body. The wheel axle is configured to position the wheel set at the outward position or the inward position. The wheel base is connected to the wheel axle. The wheel body is connected to the wheel base. The pivoting axle is pivotally connected to the base body and connected to the wheel axle. The pivoting axle links with the wheel axle so as to position the wheel set at the outward position or the inward position. The elastic member is disposed in the receiving groove and connected to the pivoting axle. One end of the elastic member is connected to the wheel axle. The elastic member provides a recovery force to the wheel set to the inward position. The positioning element is disposed in the receiving groove and selectively abutted against the wheel axle. When the wheel set is abutted by the positioning element, the wheel set is positioned at the outward position.

BRIEF DESCRIPTION OF THE DRAWINGS

The present disclosure can be more fully understood by reading the following detailed description of the embodiment, with reference made to the accompanying drawings as follows.

DESCRIPTION OF EMBODIMENTS

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

Figure 1:
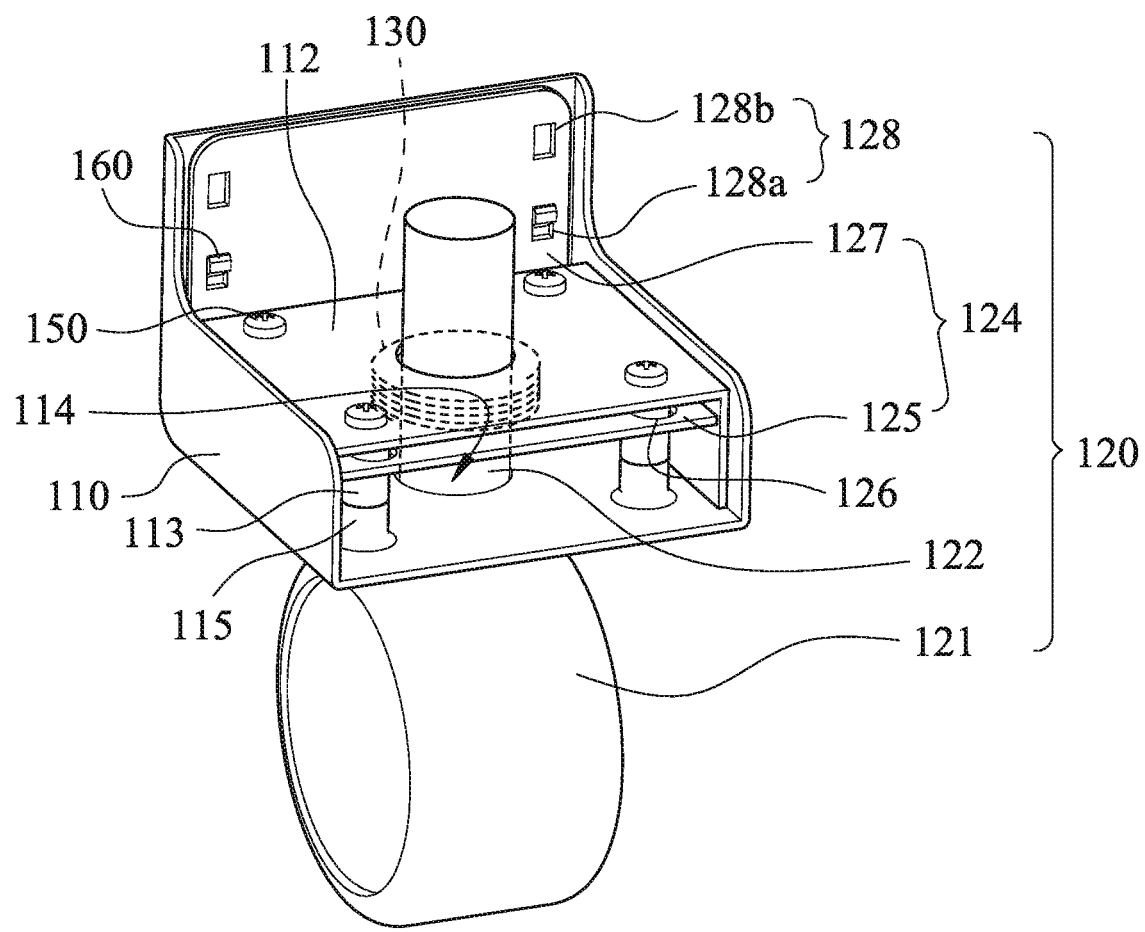
FIG. 1 is a schematic view of a first status of a telescoping wheel assembly according to a first embodiment of the present disclosure.
Figure 2:
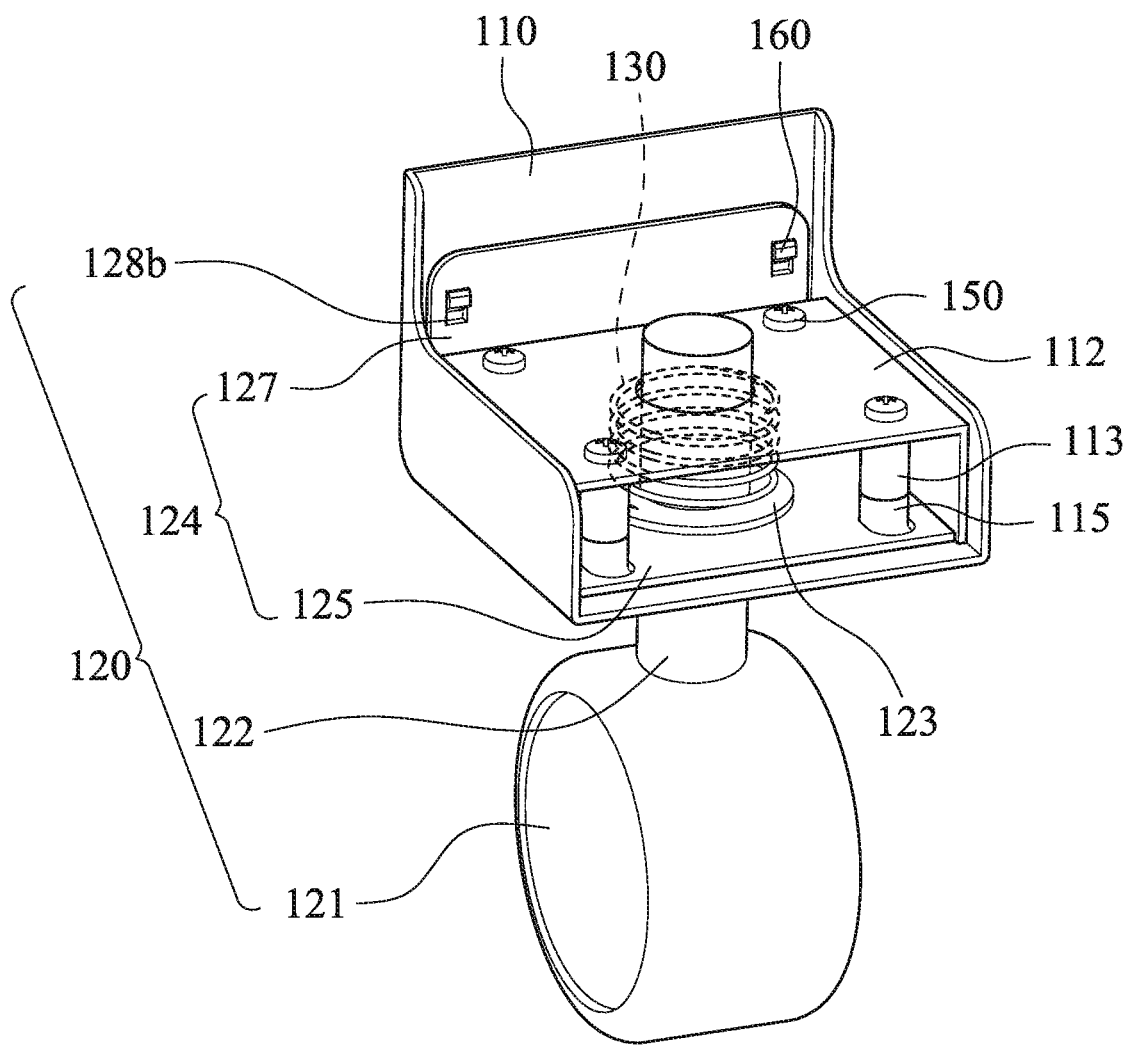
FIG. 2 is a schematic view of a second status of the telescoping wheel assembly shown in FIG. 1 according to one example embodiment.
Figure 3:
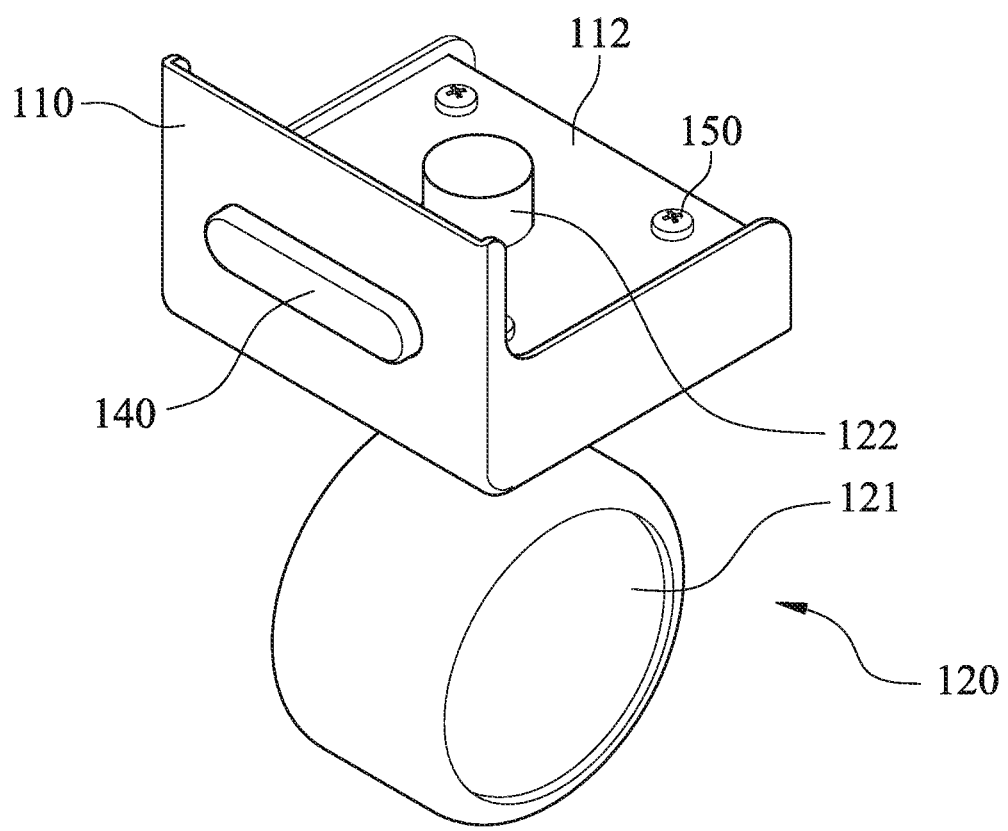
FIG. 3 is a schematic view of another viewing angle of the telescoping wheel assembly shown in FIG. 2 according to one example embodiment.
Figure 4:
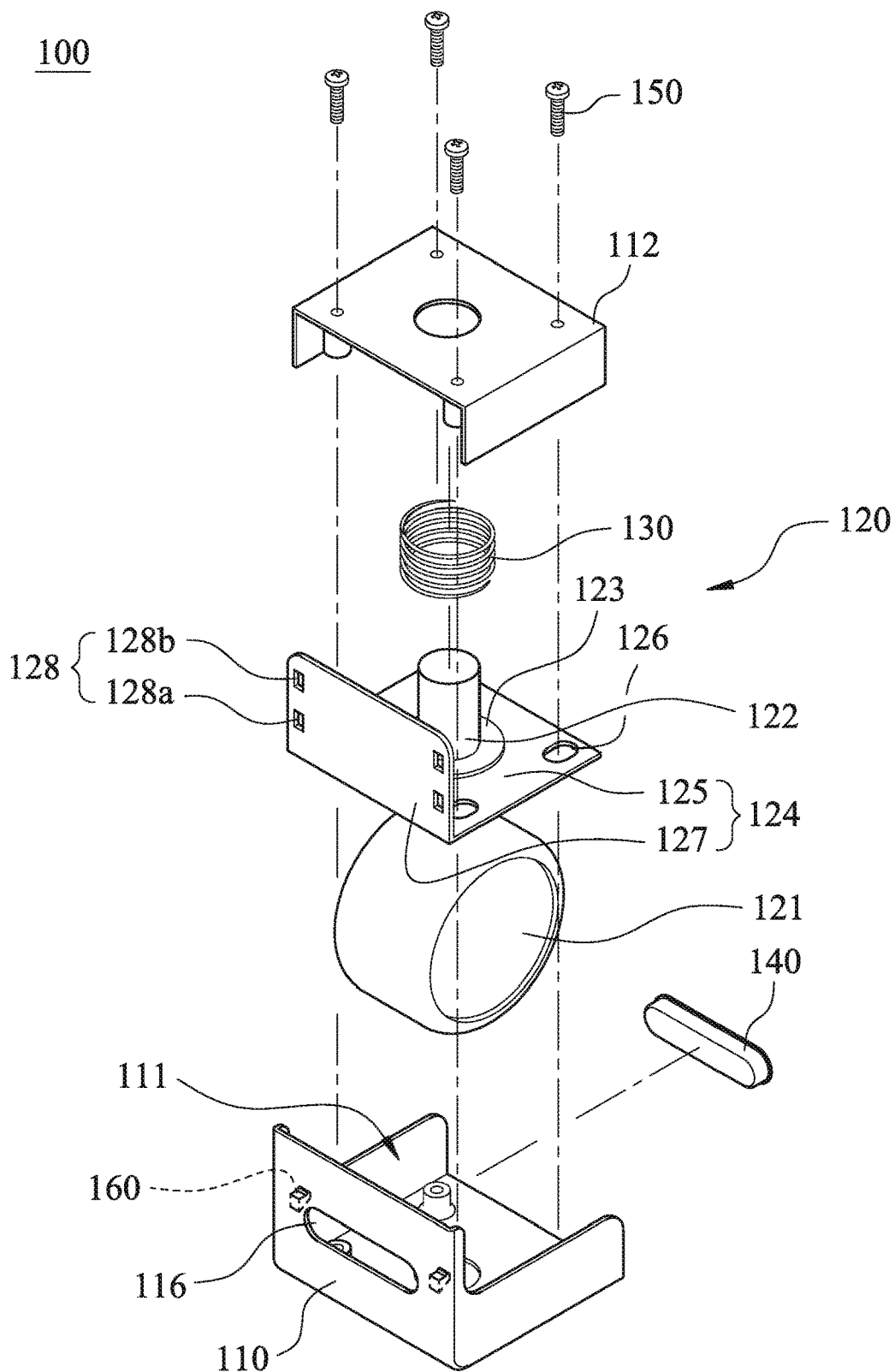
FIG. 4 is an exploded view of the telescoping wheel assembly according to FIG. 1.

FIG. 1 is a schematic view of a first status of a telescoping wheel assembly 100 according to a first embodiment of the present disclosure. FIG. 2 is a schematic view of a second status of the telescoping wheel assembly 100 according to FIG. 1. FIG. 3 is a schematic view of another viewing angle of the telescoping wheel assembly 100 according to FIG. 2. FIG. 4 is an exploded view of the telescoping wheel assembly 100 according to FIG. 1. In FIGS. 1-4, a telescoping wheel assembly 100 includes a base body 110, a wheel set 120 and an elastic member 130. The base body 110 includes a receiving groove 111. The wheel set 120 is connected to the receiving groove 111. The elastic member 130 is disposed in the receiving groove 111 and abutted against the base body 110 and the wheel set 120.

In some embodiments, the wheel set 120 includes a wheel axle 122 and a wheel body 121. The wheel body 121 is connected to an outside of the wheel axle 122. The wheel set 120 is selectively positioned at an inward position or an outward position relative to the receiving groove 111. When the wheel set 120 is positioned at the inward position, the elastic member 130 provides a pushing elastic force to the wheel set 120. The pushing elastic force is configured to adjust the wheel set 120 from the inward position to the outward position, and then a part of the wheel axle 122 is protruded from the receiving groove 111 so as to adjust an operation status of the telescoping wheel assembly 100. When the wheel set 120 is positioned at the inward position, the wheel axle 122 is adducted in the receiving groove 111 so as to avoid the wheel body 121 from being damaged. When the wheel set 120 is positioned at the outward position, the elastic member 130 provides a buffering elastic force to the wheel set 120 so as to buff an external force form a usage environment and avoid the wheel set 120 of the telescoping wheel assembly 100 from being damaged. Therefore, when the wheel set 120 is positioned at the outward position (shown in FIG. 2), the wheel body 121 is more protruded from the receiving groove 111 than the wheel set 120 is positioned at the inward position (shown in FIG. 1).

In order to provide a space for the wheel set 120 to displace. The base body 110 further includes a first plate member 112. The first plate member 112 is U-shaped and disposed in the receiving groove 111 so as to form a telescoping space 114. The wheel set 120 further includes a second plate member 124. The second plate member 124 is L-shaped and disposed in the receiving groove 111. The second plate member 124 includes a horizontal plate member 125 and a vertical plate member 127. The horizontal plate member 125 is extended into the telescoping space 114 so that the horizontal plate member 125 of the second plate member 124 can displace in the telescoping space 114. The vertical plate member 127 is connected to one end of the horizontal plate member 125. The wheel axle 122 passes through the second plate member 124, and includes a convex ring 123. The convex ring 123 is disposed on the horizontal plate member 125. Therefore, the wheel axle 122 is disposed on the horizontal plate member 125 by the convex ring 123. The second plate member 124 can links with the wheel axle 122 so as to displace in the telescoping space 114. In other words, the wheel set 120 can displaces in the telescoping space 114.

The elastic member 130 is disposed between the first plate member 112 and the second plate member 124 and surrounded to an outside of the wheel axle 122. In some embodiments, the elastic member 130 is disposed between the first plate member 112 and the convex ring 123. In FIG. 1, when the wheel set 120 is positioned at the inward position, the elastic member 130 is a compressing status because the elastic member 130 is compressed by the first plate member 112 and the wheel set 120. The elastic member 130 can provides the pushing elastic force to the wheel set 120. In FIG. 2, when the wheel set is positioned at the outward position, the elastic member 130 is an uncompressing status and disposed between the first plate member 112 and the wheel set 120. When the external force is acted on the wheel body 121, the elastic member 130 can provides the buffering elastic force so as to buff the external force and protect the wheel set 120.

In order to improve a displacing stability of the wheel set 120 in the telescoping space 114. The base body 110 further includes at least one first guiding portion 113 and at least one second guiding portion 115. The first guiding portion 113 is connected to the first plate member 112 and extended towards a bottom of the base body 110. The second guiding portion 115 extends from the bottom of the base body 110 to the first plate member 112 and connected to the first guiding portion 113 so as to provide a guiding direction. In order to connect the first guiding portion 113 and the second guiding portion 115, the telescoping wheel assembly 100 further includes a fixing element 150. The fixing element 150 passes through the first guiding portion 113 and the second guiding portion 115 so as to connect the first guiding portion 113 and the second guiding portion 115. The fixing element 150 can be a screw, but is not limited thereto. The wheel set 120 further includes at least one wheel set guiding slot 126. The wheel set guiding slot 126 is disposed at the horizontal plate member 125. The first guiding portion 113 and the second guiding portion 115 can pass through the wheel set guiding slot 126. The wheel set guiding slot 126 can be a bar-shaped slot so that the second plate member 124 can displaces along a horizontal direction relative to the base body 110. Therefore, the wheel set 120 can displaces along the guiding direction which is provided by the first guiding portion 113 and the second guiding portion 115, and improves the displacing stability of the wheel set 120 in the telescoping space 114. Further, in FIG. 1, a number of the first guiding portion 113, the second guiding portion 115, the fixing element 150 and the wheel set guiding slot 126 are 4, respectively, but are not limited thereto.

In order to stably position the wheel set 120 at the outward position or the inward position, the wheel set 120 further includes at least one positioning slot 128. The positioning slot 128 is disposed on the vertical plate member 127. The base body 110 further includes at least one hooking portion 160. The hooking portion 160 is configured to hook the positioning slot 128. In FIGS. 1 and 2, a number of the positioning slot 128 is 4 and respective to two adducting slot 128a and two protruding slot 128b. A number of the hooking portion 160 is 2. The hooking portion 160 is configured to hook to the adducting slot 128a or the protruding slot 128b so as to position the wheel set 120 at the inward position or the outward position. When the hooking portion 160 is hooked at the adducting slot 128a, the wheel set 120 is positioned at the inward position. When the hooking portion 160 is hooked at the protruding slot 128b, the wheel set 120 is positioned at the outward position. Further, when the wheel set 120 is positioned at the inward position, the wheel axle 122 is adducted in the receiving groove 111 and the telescoping wheel assembly 100 is the first status, as shown in FIG. 1. When the wheel set 120 is positioned at the outward position, the wheel axle 122 is protruded from the receiving groove 111 and the telescoping wheel assembly 100 is the second status, as shown in FIG. 2.

Referring to FIGS. 1-4, the base body 110 further includes a button slot 116. The telescoping wheel assembly 100 further includes a button 140. The button 140 passes through the button slot 116 of the base body 110. When the wheel set 120 is positioned at the inward position, the hooking portion 160 is hooked at the adducting slot 128a. When the user presses the button 140, the button 140 is adducted and pushes the vertical plate member 127 of the second plate member 124, and then the second plate member 124 displaces along the horizontal direction relative to the base body 110, and the adducting slot 128a detaches from the hooking portion 160 so that the wheel set 120 cannot stably position at the inward position. The pushing elastic force of the elastic member 130 adjusts the wheel set 120 from the inward position to the outward position, and then the hooking portion 160 is hooked at the protruding slot 128b. The telescoping wheel assembly 100 is adjusted from the first status to the second status. When the wheel set 120 is positioned at the outward position, the hooking portion 160 is hooked at the protruding slot 128b. When the user provides an adducting external force to the wheel set 120, the protruding slot 128b detaches from the hooking portion 160, and the wheel set 120 compresses the elastic member 130 so as to hook the adducting slot 128a on the hooking portion 160 and position the wheel set 120 at the inward position. The telescoping wheel assembly 100 is adjusted from the second status to the first status so as to protect the wheel set 120 and avoid the wheel set 120 from being damaged.

Figure 5:
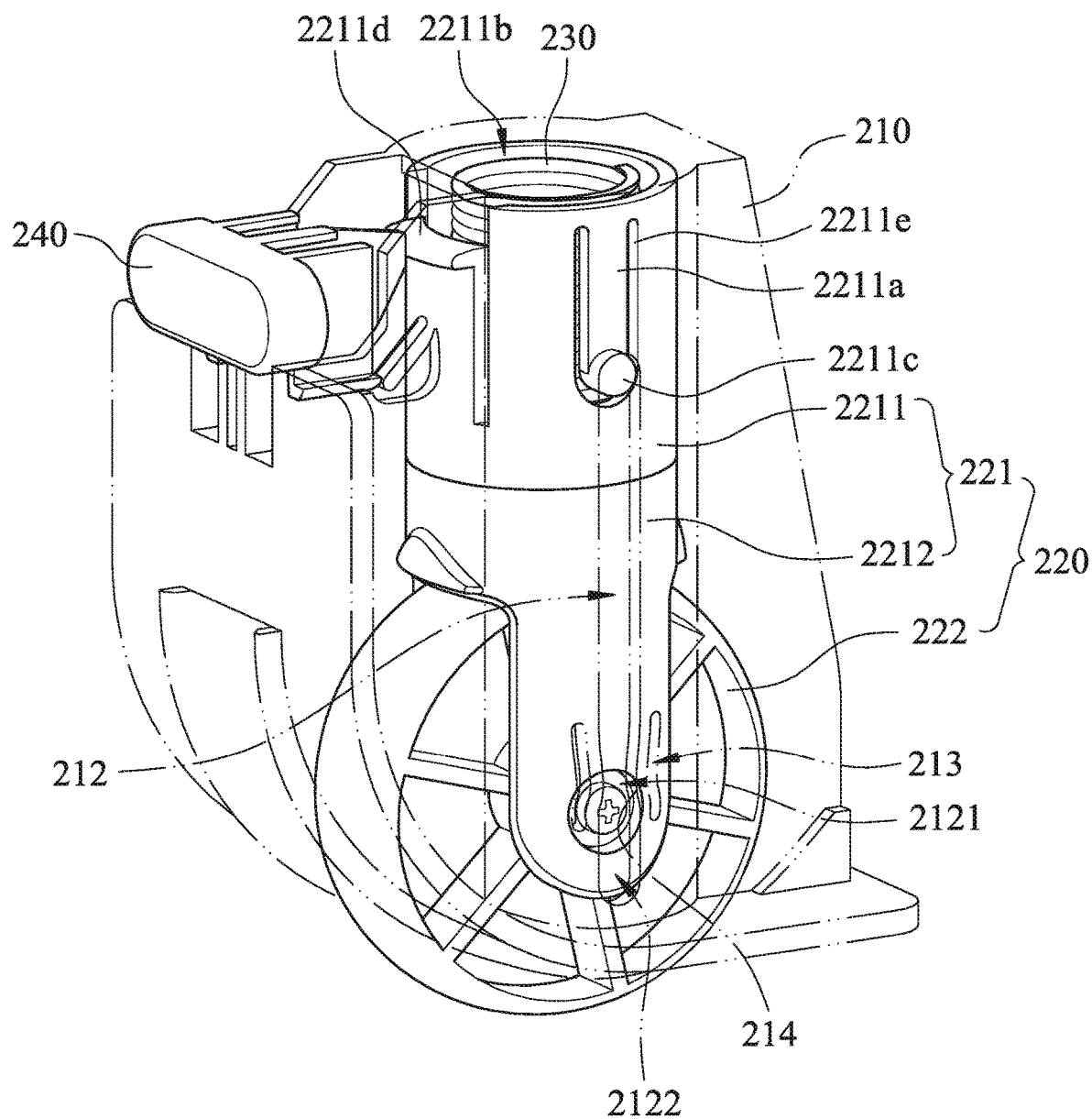
FIG. 5 is a schematic view of a telescoping wheel assembly according to a second embodiment of the present disclosure.
Figure 6:
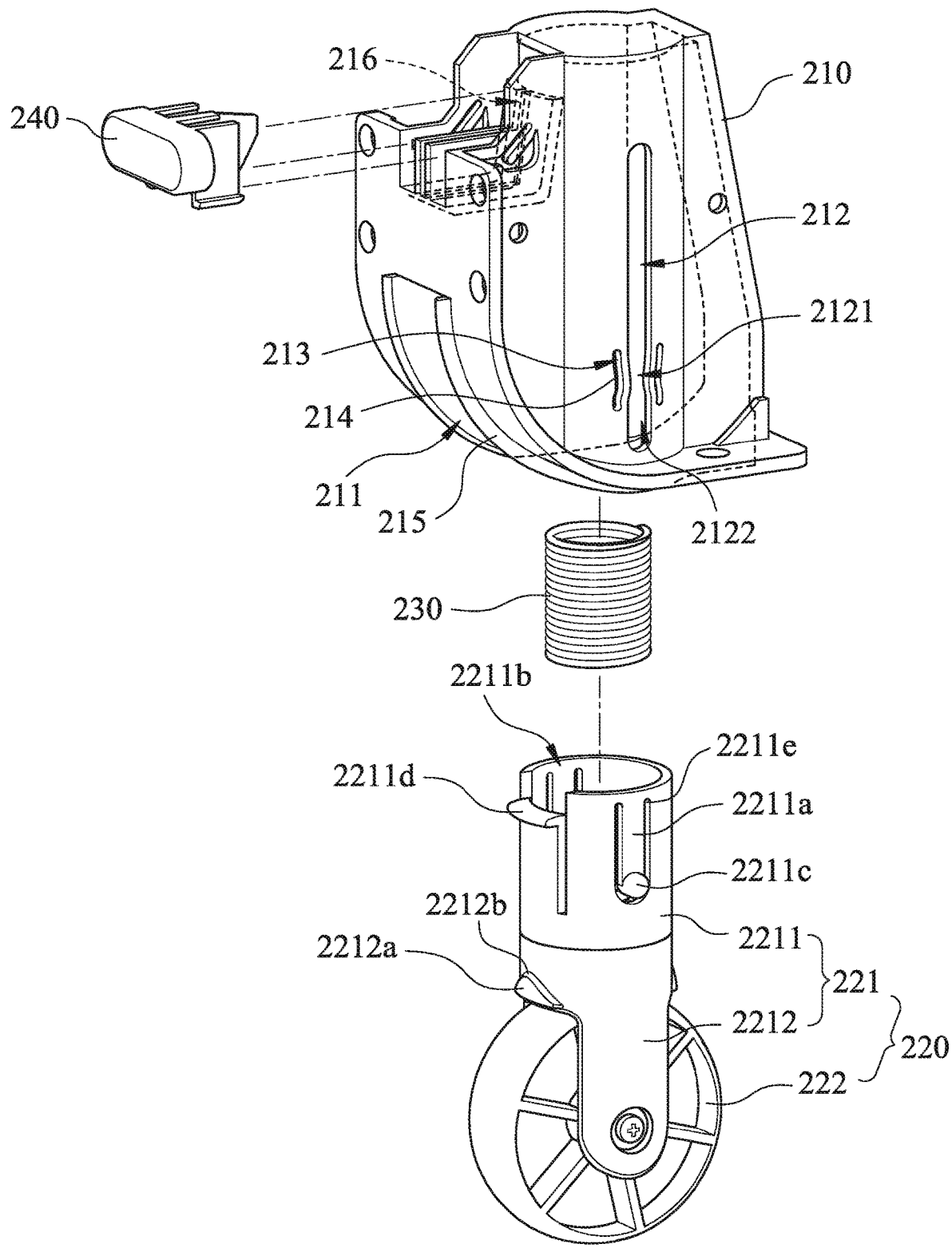
FIG. 6 is an exploded view of the telescoping wheel assembly according to FIG. 5.
Figure 7:
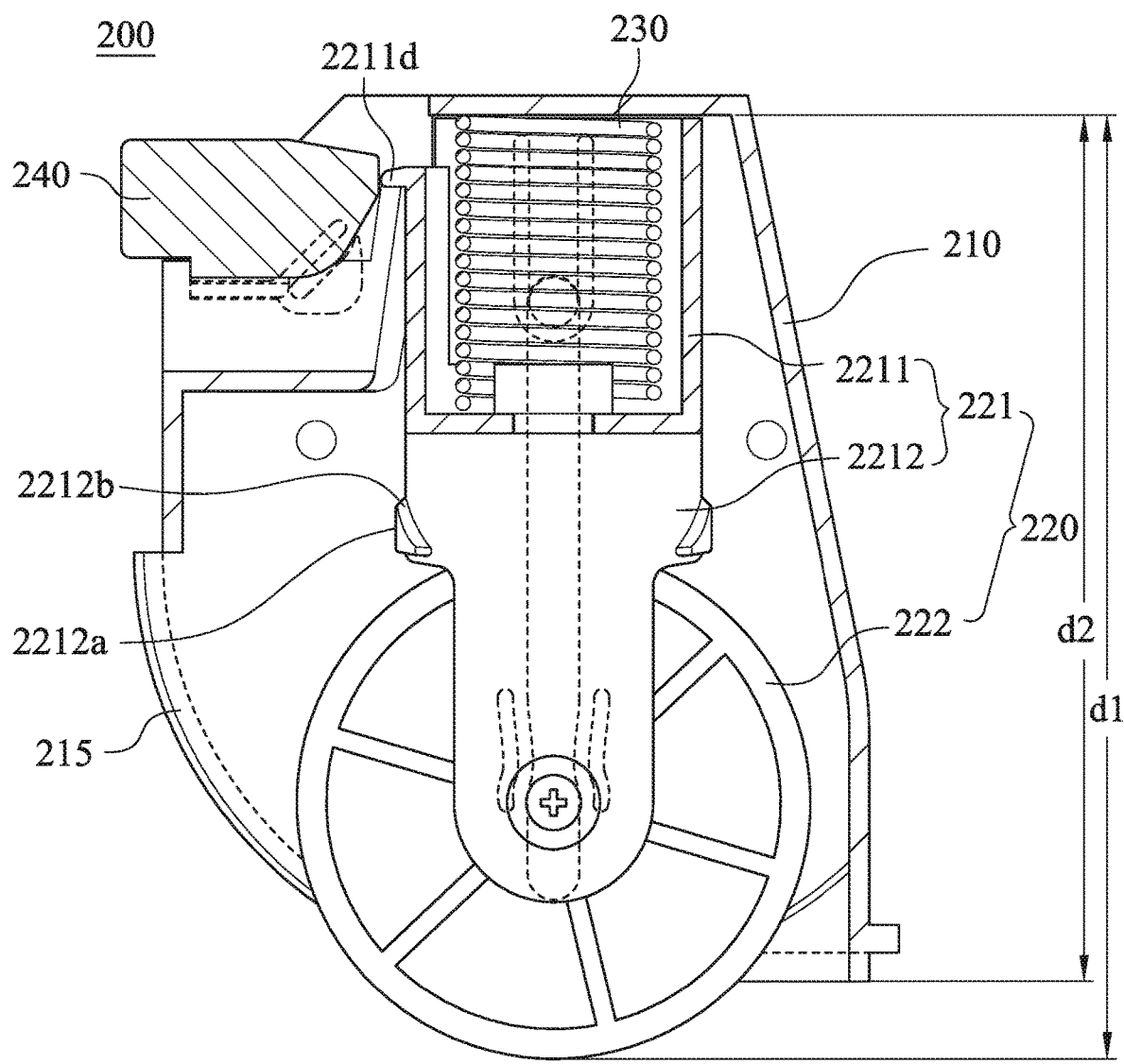
FIG. 7 is a side view of a first status of the telescoping wheel assembly according to FIG. 5.
Figure 8:
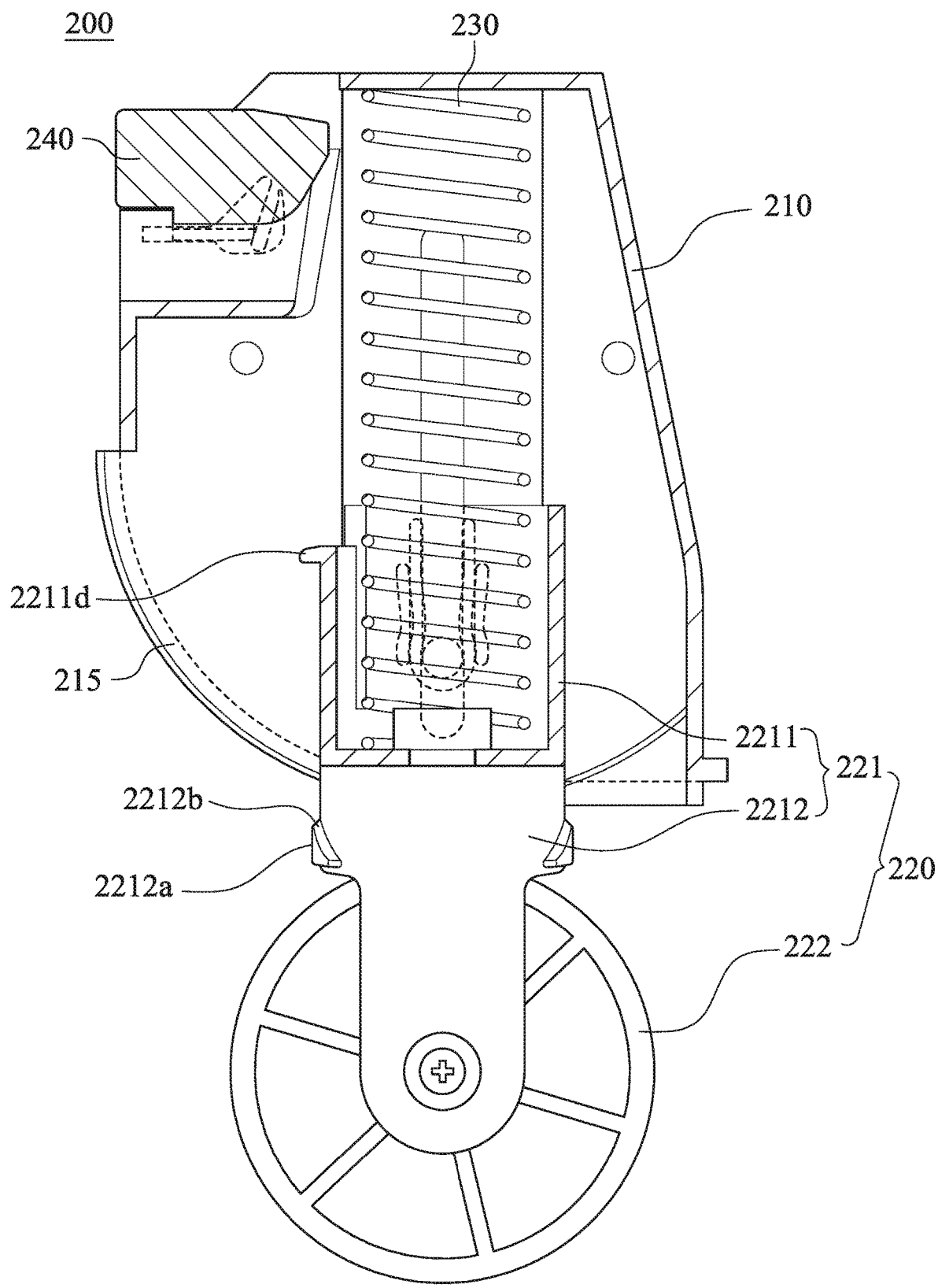
FIG. 8 is a side view of a second status of the telescoping wheel assembly according to FIG. 5.

FIG. 5 is a schematic view of a telescoping wheel assembly 200 according to a second embodiment of the present disclosure. FIG. 6 is an exploded view of the telescoping wheel assembly 200 according to FIG. 5. FIG. 7 is a side view of a first status of the telescoping wheel assembly 200 according to FIG. 5. FIG. 8 is a side view of a second status of the telescoping wheel assembly 200 according to FIG. 5. In FIGS. 5-8, a telescoping wheel assembly 200 includes a base body 210, a wheel set 220 and an elastic member 230. The base body 210 includes a receiving groove 211. The wheel set 220 is connected to the receiving groove 211 and selectively positioned at an outward position or an inward position relative to the receiving groove 211, and includes a wheel axle 221 and a wheel body 222. The wheel body 222 is connected to an outside of the wheel axle 221. The elastic member 230 is disposed in the receiving groove 211, and abutted against the base body 210 and the wheel set 220.

In some embodiments, the base body 210 further includes at least one base body base body guiding slot 212, at least one adjusting slot 213 and a deforming portion 214. The base body guiding slot 212 is communicated to the receiving groove 211, and includes a tapering portion 2121. The adjusting slot 213 is disposed at one side of the tapering portion 2121. The deforming portion 214 is deformably disposed between the adjusting slot 213 and the base body guiding slot 212. Because of the adjusting slot 213, an elastic of the deforming portion 214 can be increased so that when the deforming portion 214 is pushed, the deforming portion 214 can deforms toward the adjusting slot 213. In FIG. 5, a number of the adjusting slot 213 is 2, and the adjusting slots 213 are disposed at two sides of the tapering portion 2121, respectively. A number of the deforming portion 214 is 2, and the deforming portions 214 are disposed between the adjusting slot 213 and the base body guiding slot 212, respectively.

The wheel axle 221 includes an upper wheel axle 2211 and a lower wheel axle 2212. The upper wheel axle 2211 includes at least one extended positioning portion 2211a. The extended positioning portion 2211a is limited by the tapering portion 2121 so as to position the wheel set 220. The lower wheel axle 2212 is pivotally connected to the upper wheel axle 2211, and includes at least one guiding portion 2212a. The guiding portion 2212a is abutted by the base body 210 so as to guide the lower wheel axle 2212. The wheel body 222 is connected to the lower wheel axle 2212. When the wheel set 220 is positioned at the outward position (as shown in FIG. 8), the lower wheel axle 2212 is pivotally protruded from the base body 210 and the wheel body 222 is protruded from the base body 210, fully. When the wheel set 220 is positioned at the inward position, the lower wheel axle 2212 is adducted into the base body 210 and a part of the wheel body 222 is protruded from the base body 210. The elastic member 230 is disposed in the receiving groove 211, and abutted against the base body 210 and the wheel set 220. Therefore, when the wheel set 220 is positioned at the outward position, the telescoping wheel assembly 200 is the second status (as shown in FIG. 8). The elastic member 230 is the uncompressing status so that the elastic member 230 can provide the buffering elastic force to the wheel set 220 so as to buff the external force form the usage environment and avoid the wheel set 220 from being damaged. When the wheel set 220 is positioned at the inward position, the telescoping wheel assembly 200 is the first status (as shown in FIG. 7). The elastic member 230 is compressed by the upper wheel axle 2211 and the base body 210, so that the elastic member 230 is the compressing status. When the wheel set 220 is adjusted from the inward position to the outward position, the elastic member 230 provides the pushing elastic force to the wheel set 220 so as to adjust the wheel set 220 from the inward position to the outward position. Further, when the wheel set 220 is adjusted from outward position to the inward position or adjusted from inward position to the outward position, the extended positioning portion 2211a of the upper wheel axle 2211 displaces in the base body guiding slot 212. When the extended positioning portion 2211a displaces in the tapering portion 2121, the deforming portion 214 is pushed by the extended positioning portion 2211a and deforms toward the adjusting slot 213 so that the extended positioning portion 2211a does not limited by the tapering portion 2121, and then passes the tapering portion 2121. When the extended positioning portion 2211a passes the tapering portion 2121, the deforming portion 214 is restored and the tapering portion 2121 limits the upper wheel axle 2211 so that the upper wheel axle 2211 can be positioned.

Figure 9:
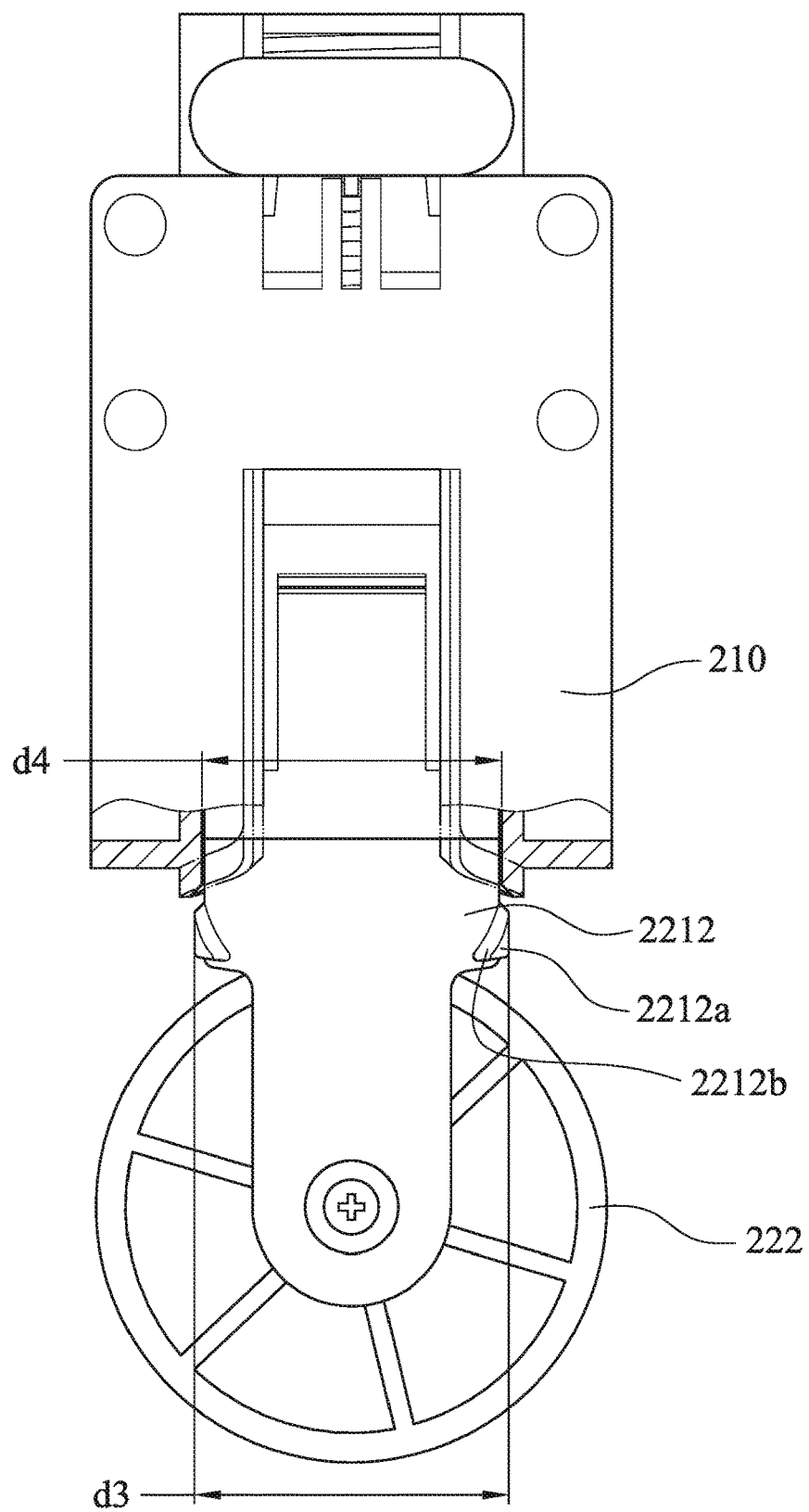
FIG. 9 is a schematic view showing a distance of a guiding length and an opening length of the telescoping wheel assembly according to FIG. 5.

Please refer to FIGS. 7 and 8, the wheel set 220 has a wheel set length d1. The receiving groove 211 has a receiving groove length d2. The wheel set length d1 is greater than the receiving groove length d2. Therefore, when the wheel set 220 is positioned at the inward position, a part of the wheel body 222 is protruded from the base body 210. FIG. 9 is a schematic view of a guiding length d3 and an opening length d4 of the telescoping wheel assembly 200 according to FIG. 5. In FIGS. 5-9, the guiding portion 2212a of the lower wheel axle 2212 includes an arc-edge 2212b. The base body 210 further includes an opening portion 215. The opening portion 215 is disposed at an outside of the receiving groove 211. When the wheel set 220 is adjusted from the outward position to the inward position, the arc-edge 2212b of the guiding portion 2212a is abutted by the opening portion 215 so as to guide the lower wheel axle 2212, and then the wheel set 220 is guided to a receiving direction and adducted into the base body 210. The guiding portion 2212a can be a triangle-shaped which has an arc edge, an arch-shaped or a circle-shaped, but is not limited thereto. In other words, when the wheel set 220 is positioned at the outward position, the lower wheel axle 2212 of the wheel set 220 is pivotably protruded from the base body 210, and the telescoping wheel assembly 200 can be used, omnidirectionally. When the wheel set 220 is positioned at the inward position, the lower wheel axle 2212 is directionally adducted in the base body 210 and the part of the wheel body 222 is protruded from the base body 210, so that the telescoping wheel assembly 200 can be used directionally. The lower wheel axle 2212 has a guiding length d3. The opening portion 215 has an opening length d4. The guiding length d3 is greater than the opening length d4, as shown in FIG. 9. In FIG. 9, a number of the guiding portion 2212a is 2. Therefore, when the wheel set 220 is adjusted from the outward position to the inward position, the arc-edge 2212b of the guiding portion 2212a is abutted by the opening portion 215 so as to guide the lower wheel axle 2212 to the receiving direction and adducted into the base body 210, directionally.

In order to position the wheel set 220 at the outward position, the base body guiding slot 212 further includes a fixing portion 2122. The fixing portion 2122 is disposed at one end of the tapering portion 2121. When extended positioning portion 2211a is clasped to the fixing portion 2122, the wheel set 220 is positioned at the outward position relative to the receiving groove 211. The extended positioning portion 2211a includes a curving block 2211c. The curving block 2211c is extended into the base body guiding slot 212. In some embodiments, the fixing portion 2122 is disposed at the end of the tapering portion 2121 which is closed to the opening portion 215 of the base body 210. Therefore, when the curving block 2211c of the extended positioning portion 2211a of the upper wheel axle 2211 is limited by the tapering portion 2121 and clasped to the fixing portion 2122, the wheel set 220 is positioned at the outward position. The telescoping wheel assembly can be used, omnidirectionally. The curving block 2211c can be a hemi-spherical curving block or an elliptic curving block, but is not limited thereto.

In order to decrease a volume of the telescoping wheel assembly 200, the upper wheel axle 2211 further includes a receiving space 2211b. One end of the elastic member 230 is extended into the receiving space 2211b so as to decrease the volume of the telescoping wheel assembly 200 and utilize the volume of the telescoping wheel assembly 200, plenty.

The upper wheel axle 2211 further includes a U-shaped slot 2211e. The U-shaped slot 2211e is surrounded to the extended positioning portion 2211a so as to increase an elastic of the extended positioning portion 2211a. Therefore, when the extended positioning portion 2211a pushes the deforming portion 214, the deforming portion 214 is deformed toward the adjusting slot 213 and the extended positioning portion 2211a is deformed toward the receiving space 2211b so as to avoid the deforming portion 214 from being damaged and improve a durability of the telescoping wheel assembly 200.

In order to position the wheel set 220 at the inward position, the base body 210 further includes a fixing slot 216. The fixing slot 216 is communicated to the receiving groove 211. The upper wheel axle 2211 further includes a positioning block 2211d. When the positioning block 2211d is extended into the fixing slot 216, the wheel set 220 is positioned at the inward position. In FIG. 7, the positioning block 2211d of the upper wheel axle 2211 is extended to the fixing slot 216 so as to position the wheel set 220 at the inward position. Therefore, the wheel set can firmly be adducted into the base body 210, and avoid the wheel set 220 from being damaged.

In order to adjust the wheel set 220 from inward position to the outward position, the telescoping wheel assembly 200 further includes a button 240. The button 240 is disposed at the base body 210 and extended to the fixing slot 216. When the button 240 pushes the positioning block 2211d, the wheel set 220 is adjusted from the inward position to the outward position. In some embodiments, when the button 240 is pushed and displaced toward the receiving space 2211b, the positioning block 2211d is pushed and detached from the fixing slot 216. The wheel set 220 is pushed by the pushing elastic force which is provided the elastic member 230, and then displaced in the receiving groove 211 and positioned at the outward position.

Figure 10:
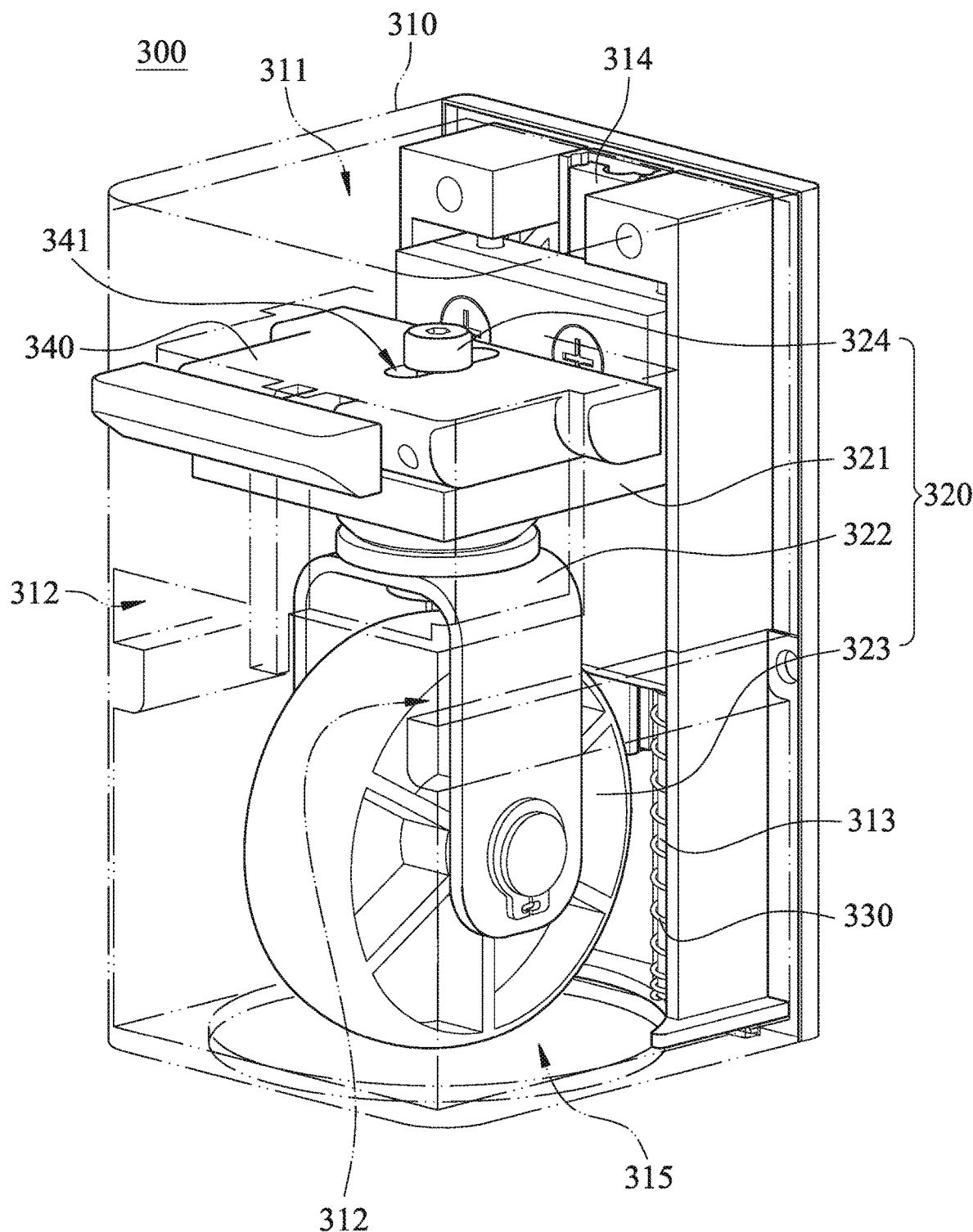
FIG. 10 is a schematic view of a telescoping wheel assembly according to a third embodiment of the present disclosure.
Figure 11:
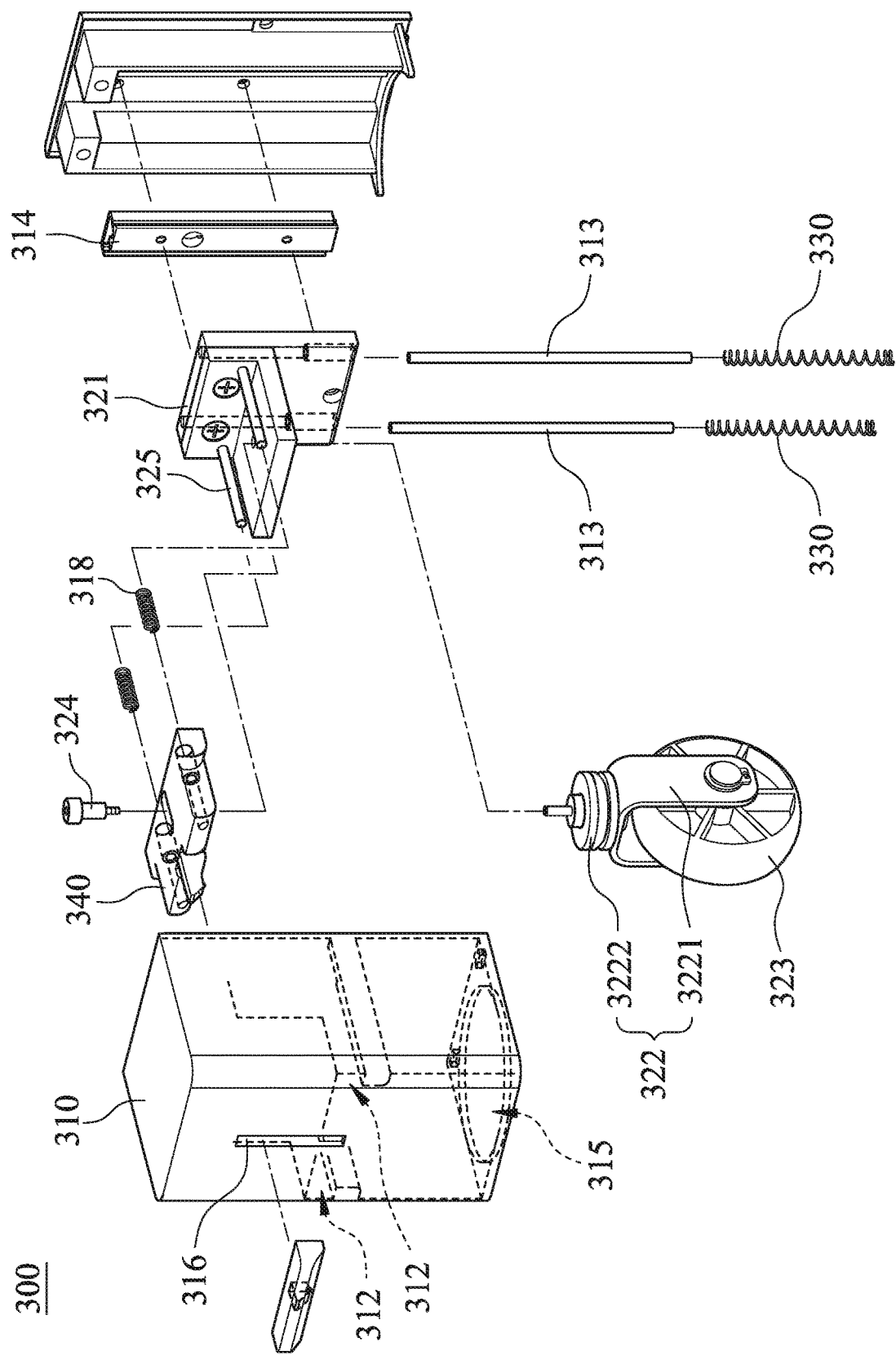
FIG. 11 is an exploded view of the telescoping wheel assembly according to FIG. 10.
Figure 12:
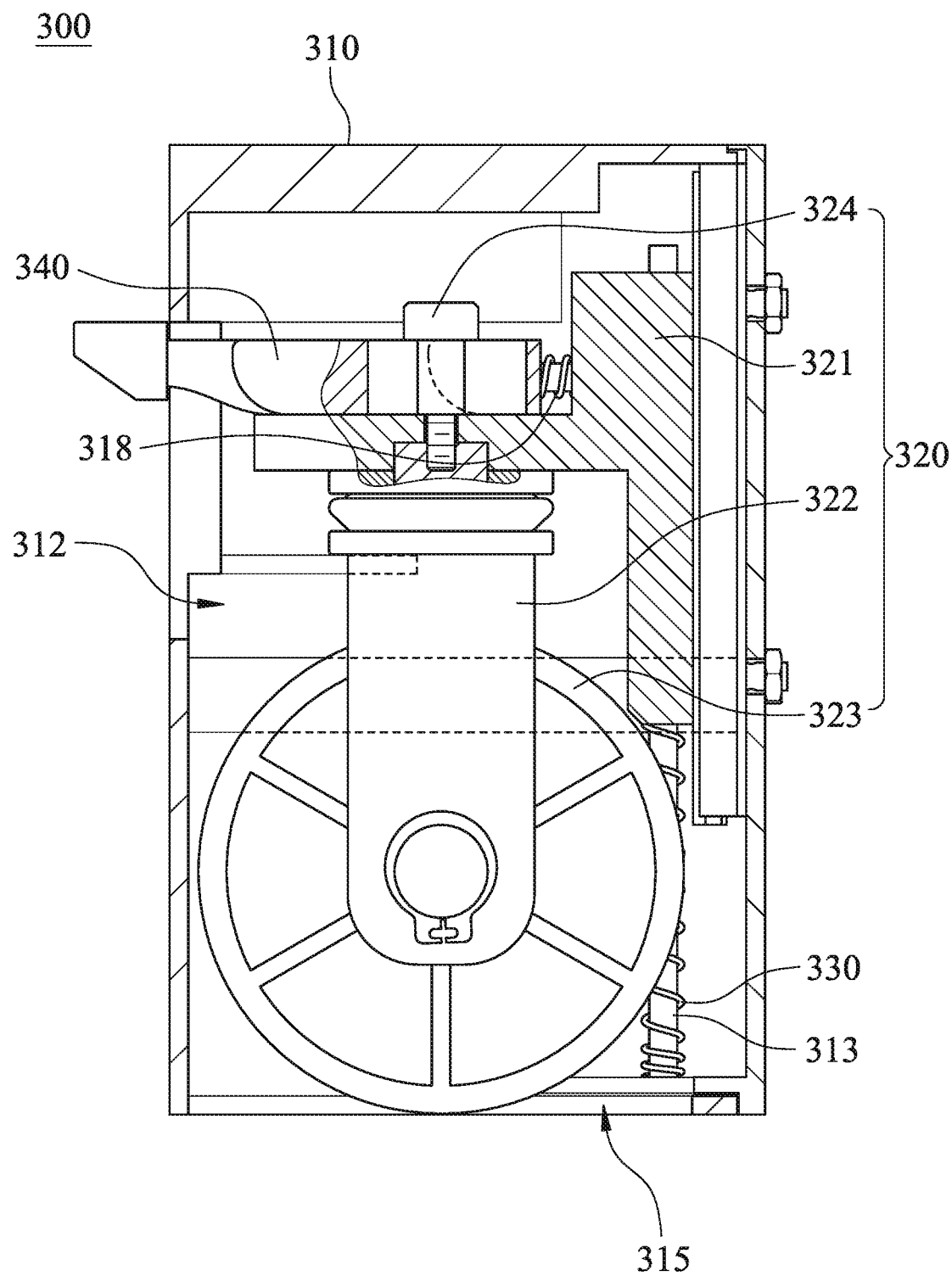
FIG. 12 is a side view of a first status of the telescoping wheel assembly according to FIG. 10.
Figure 13:
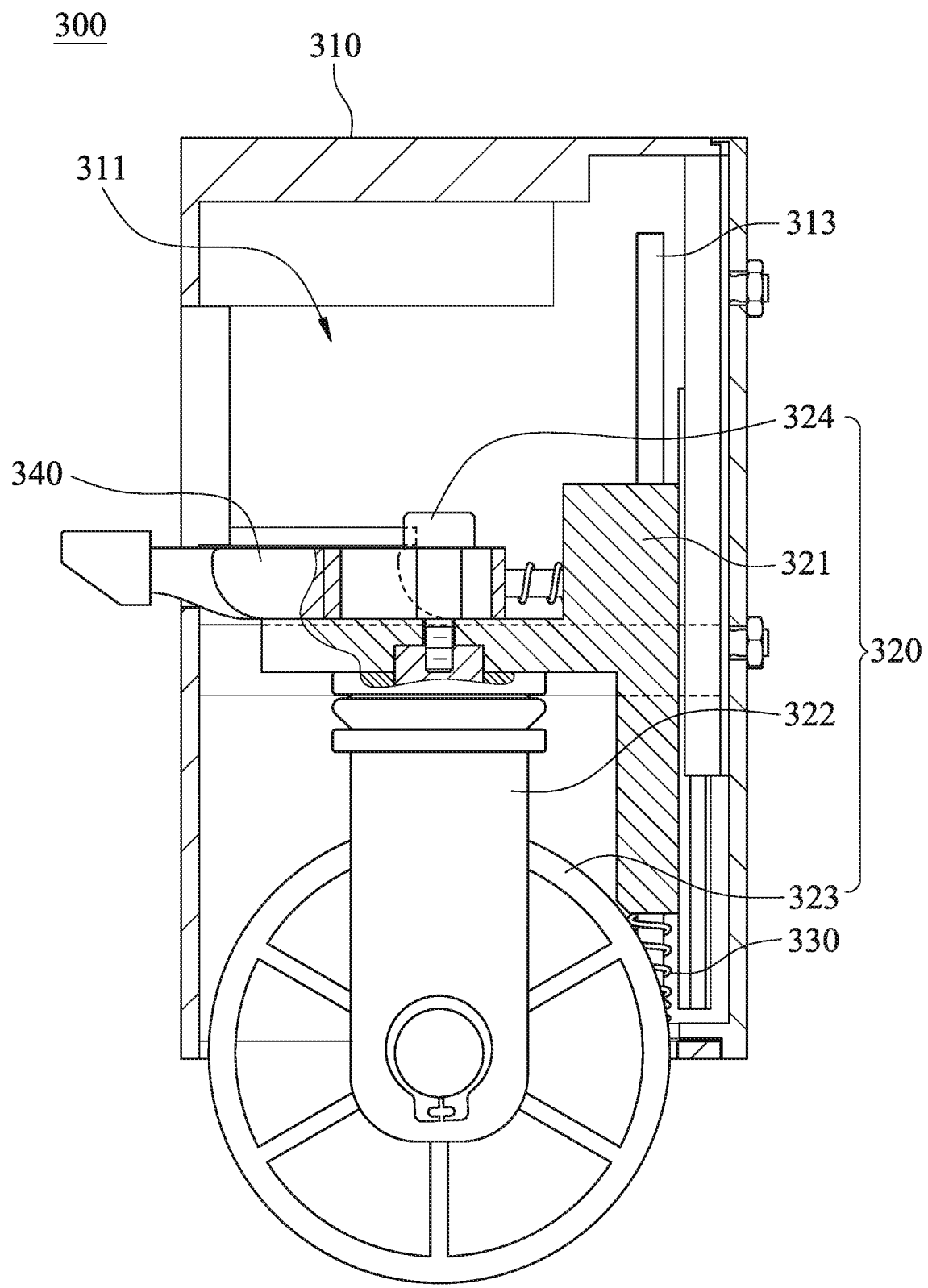
FIG. 13 is a side view of a second status of the telescoping wheel assembly according to FIG. 10.

FIG. 10 is a schematic view of a telescoping wheel assembly 300 according to a third embodiment of the present disclosure. FIG. 11 is an exploded view of the telescoping wheel assembly 300 according to FIG. 10. FIG. 12 is a side view of a first status of the telescoping wheel assembly 300 according to FIG. 10. FIG. 13 is a side view of a second status of the telescoping wheel assembly 300 according to FIG. 10. In FIGS. 10-13, the telescoping wheel assembly 300 includes a base body 310, a wheel set 320, at least one elastic member 330 and a button 340. The wheel set 320 and at least one elastic member 330 are disposed at the base body 310. The button 340 is passed through the base body 310.

In some embodiments, the base body 310 includes a receiving groove 311 and an extending groove 312. The extending groove 312 is communicated to the receiving groove 311. The wheel set 320 is disposed in the receiving groove 311 and selectively positioned at an outward position or an inward position relative to the receiving groove 311. In FIG. 12, the wheel set 320 is positioned at the inward position, and the telescoping wheel assembly 300 is the first status. In FIG. 13, the wheel set 320 is positioned at the outward position, and the telescoping wheel assembly 300 is the second status. The wheel set 320 includes an adjusting element 321, a wheel axle 322 and a wheel body 323. The adjusting element 321 is disposed in the receiving groove 311. The wheel axle 322 is disposed on the adjusting element 321. The wheel body 323 is connected to the wheel axle 322. The elastic member 330 is disposed in the receiving groove 311 and abutted against the wheel set 320. In FIG. 10, the elastic member 330 is abutted against the adjusting element 321 and the base body 310. When the wheel set 220 is positioned at the outward position, the elastic member 330 provides a telescoping elastic force. The button 340 is movably disposed at the wheel set 320 and extends out of the base body 310. The button 340 is operated in one of a protruding status (shown in FIG. 13) and an adducting status (shown in FIG. 12). When the button 340 is adjusted from the adducting status to the protruding status, the button 340 is clasped into the extending groove 312 so as to position the wheel set 320 at the outward position. When the button 340 is adjusted from the protruding status to the adducting status, the elastic member 330 pushes the wheel set 320, and then the wheel set 320 is adjusted from the outward position to the inward position. The elastic member 330 is disposed at an opening side of the receiving groove 311, which is closed to an opening portion 315. Two sides of the elastic member 330 are respectively abutted against the base body 310 and the adjusting element 321 of the wheel set 320 so as to provide the telescoping elastic force to the wheel set 320. In FIG. 11, a number of the elastic member 330 is 2, but is not limited thereto. In other words, when the wheel set 320 is positioned at the inward position, the button 340 is the adducting status. The elastic member 330 is the uncompressing status and abutted against the adjusting element 321 so as to position the wheel set 320 at the inward position, thus protecting the wheel set 320, as shown in FIG. 12. In FIG. 13, when the wheel set 320 is positioned at the outward position, the elastic member 330 is pushed by the wheel set 320 so that the elastic member 330 is the compressing status and provides the telescoping elastic force to the wheel set 320. The button 340 is the protruding status and clasped into the extending groove 312 so as to position the wheel set 320 at the outward position, and then the wheel set 320 is extended out from the opening portion 315 of the base body 310. It is important, in FIG. 13, the elastic member 330 is not compressed, completely. Therefore, when the button 340 is adjusted from the protruding status to the adducting status, the telescoping elastic force of the elastic member 330 can adjusts the wheel set 320 from outward position to the inward position. When the wheel set 320 is positioned at the outward position, the telescoping elastic force of the elastic member 330 can buffs the external force form the usage environment so as to avoid the telescoping wheel assembly 300 from being damaged.

Please refer to the FIGS. 12 and 13, when the wheel set 320 is positioned at the outward position, the user can push the button 340 so as to adjust the button 340 from the protruding status to the adducting status, and detaches from the extending groove 312. When the wheel set 320 is pushed by the telescoping elastic force provided by the elastic member 330, the wheel set 320 is displaced in the receiving groove 311 and adjusted from the outward position to the inward position. When the wheel set 320 is positioned at the inward position, user can push the button 340 so as to adjust the wheel set 320 displaced toward the opening portion 315, and then the button 340 is adjusted from the adducting status to the protruding status and clasped into the extending groove 312 so as to position the wheel set 320 at the outward position.

In order to movably dispose the button 340 at the wheel set 320, the button 340 further includes a status adjusting slot 341. The status adjusting slot 341 is a bar-shaped. The wheel set 320 further includes a button fixing element 324. The button fixing element 324 passes through the status adjusting slot 341 and connected to the wheel axle 322 so as to movably dispose the button 340 at the wheel set 320. The button 340 is disposed at the adjusting element 321 of the wheel set 320. The button fixing element 324 passes through the adjusting element 321 and the status adjusting slot 341 of the button 340, and connected to the wheel axle 322.

Therefore, the button 340 can displace on the adjusting element 321 so as to adjust a status of the button 340, such as the protruding status and the adducting status. When the button 340 is the protruding status, the button 340 is more protrudes from the base body 310 than the button 340 is the adducting status.

The base body 310 further includes at least one guiding axle 313, an adjusting axle 314 and a position adjusting slot 316. The guiding axle 313 passes through the adjusting element 321 and surrounded by the elastic member 330. In FIG. 11, a number of the guiding axle 313 is 2, but is not limited thereto. The adjusting axle 314 is connected to the adjusting element 321 so as to limit a displacing direction of the wheel set 320. The position adjusting slot 316 is a bar-shaped and passed through by the button 340. The button 340 can displaces in the position adjusting slot 316. In other words, the telescoping wheel assembly 300 can limits the displacing direction of the wheel set 320 in the receiving groove 311 via the adjusting axle 314 and the guiding axle 313 so as to improve a displacing stability of the wheel set 320 in the telescoping space 114. The user can push the button 340, and then the button 340 is displaced on the position adjusting slot 316 and the wheel set 320 is displaced in the receiving groove 311 so as to adjust a position of the wheel set 320, such as the outward position or the inward position.

Further, the elastic member 330 is surrounded to the guiding axle 313, and disposed close to the opening portion 315 of the receiving groove 311. Two sides of the elastic member 330 are abutted against the adjusting element 321 of the wheel set 320 and the base body 310, respectively. In some embodiments, when the button 340 is the protruding status, the button 340 is clasped to the extending groove 312 so as to position the wheel set 320 at the outward position. The elastic member 330 is compressed by the adjusting element 321 of the wheel set 320 so that the elastic member 330 is the compressing status and provided the telescoping elastic force to the wheel set 320. When the button 340 is adjusted from protruding status to the adducting status, the wheel set 320 is adjusted to the inward position by the telescoping elastic force of the elastic member 330. When the wheel set 320 is positioned at the outward position, the telescoping elastic force of the elastic member 330 can buffs the external force form the usage environment so as to avoid the telescoping wheel assembly 300 from being damaged and improve the durability of the telescoping wheel assembly 300.

Please refer to FIGS. 12 and 13, in order to adjust the status of the button 340, the base body 310 further includes a positioning elastic member 318. The positioning elastic member 318 is disposed between the adjusting element 321 and the button 340, thus adjusting the button 340 from the adducting status to the protruding status so as to clasp the button 340 to the extending groove 312. In some embodiments, the button 340 can be adjusted into the extending groove 312 by the positioning elastic member 318 so as to stably position the wheel set 320 at the outward position. When the user pushes the button 340, the button 340 pushes and compresses the positioning elastic member 318, and then the positioning elastic member 318 detaches from the extending groove 312. The wheel set 320 is pushed by the telescoping elastic force of the elastic member 330, and displaced in the receiving groove 311 so as to position the wheel set 320 at the inward position. Further, in order to stably disposed the positioning elastic member 318 between the adjusting element 321 and the button 340, the adjusting element 321 further includes at least one adjusted fixing element 325. The adjusted fixing element 325 is passed through the button 340 and surrounded by the positioning elastic member 318. In FIG. 11, a number of the adjusted fixing element 325 is 2, but is not limited thereto. Therefore, the positioning elastic member 318 can be stably disposed between the adjusting element 321 and the button 340.

Figure 14:
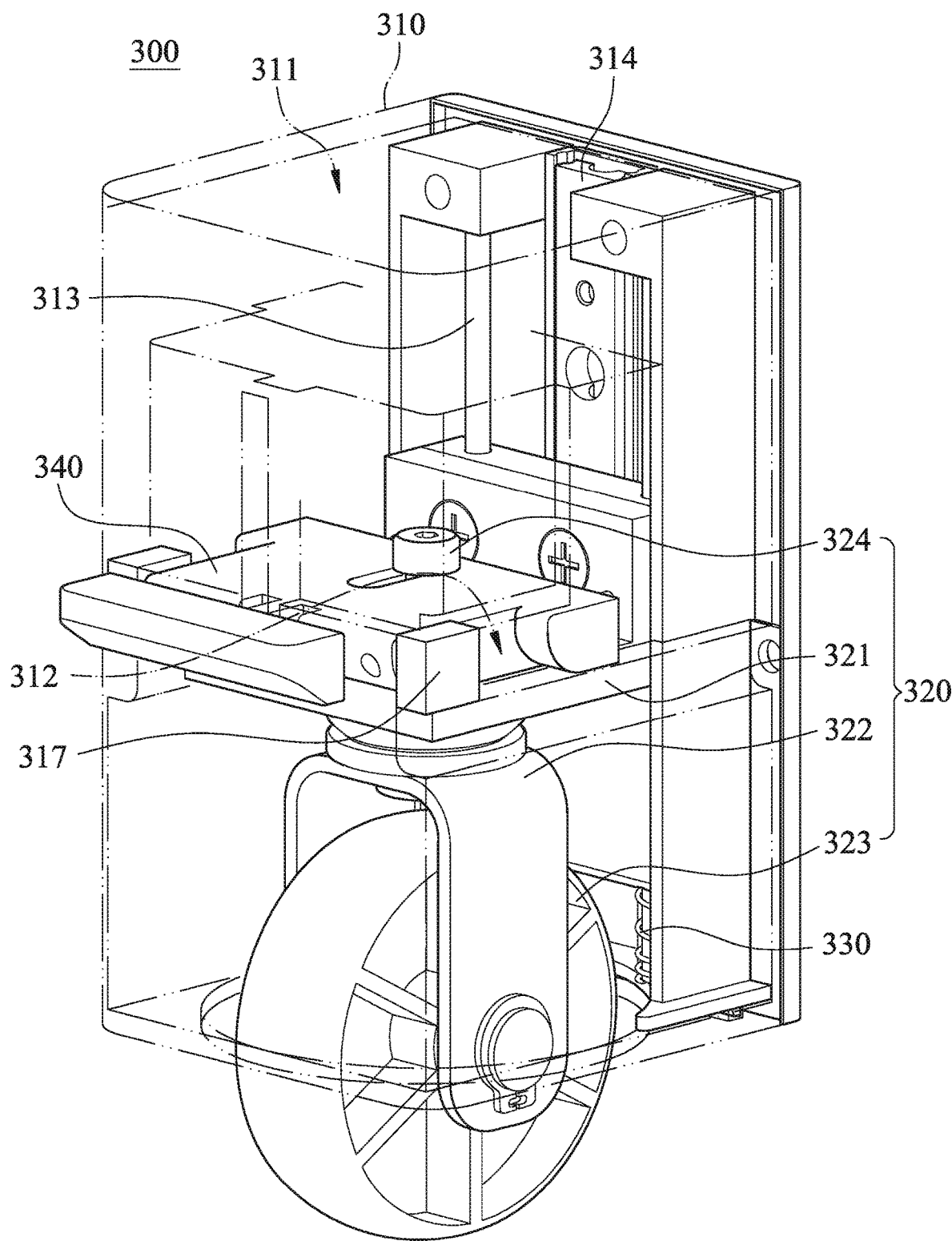
FIG. 14 is a schematic view of a telescoping wheel assembly according to a fourth embodiment of the present disclosure.

FIG. 14 is a schematic view of a telescoping wheel assembly 300 according to a fourth embodiment of the present disclosure. In FIG. 14, in order to adjust the status of the button 340, the base body 310 further includes a magnetic positioning element 317. The magnetic positioning element 317 is disposed at the extending groove 312, thus adjusting the button 340 from the adducting status to the protruding status so as to clasp the button 340 into the extending groove 312. In some embodiments, the button 340 can be a magnetic material. The magnetic positioning element 317 which is disposed at the extending groove 312 can attract the button 340 so as to adjust the button 340 from the adducting status to the protruding status, and clasped the button 340 into the extending groove 312, thus stably positioning the wheel set 320 at the outward position. When the user pushes the button 340, the button 340 can detached from the extending groove 312 and the wheel set 320 is pushed by the telescoping elastic force of the elastic member 330, and then displaced in the receiving groove 311 so as to adjust the wheel set 320 to the inward position.

In order to uses the telescoping wheel assembly, omnidirectionally. The wheel set 320 further includes a wheel body fixing element 3221. The wheel body fixing element 3221 is pivotally disposed at one side of the wheel axle 322, and the wheel body 323 is pivotally disposed at the wheel body fixing element 3221. The wheel body fixing element 3221 is a U-shaped and can rotates 360 degrees, but is not limited thereto.

In order to avoid the wheel set 320 from being damaged, the wheel set 320 further includes a buffing elastic member 3222. The buffing elastic member 3222 is disposed between the adjusting element 321 and the wheel body fixing element 3221. Therefore, when the telescoping wheel assembly 300 is used on the usage environment, the buffing elastic member 3222 can buffs the external force form the usage environment. In other words, both of the buffing elastic member 3222 and the elastic member 330 can buffs the external force form the usage environment so as to avoid the wheel set 320 from being damaged and improve the durability of the telescoping wheel assembly 300.

Figure 15:
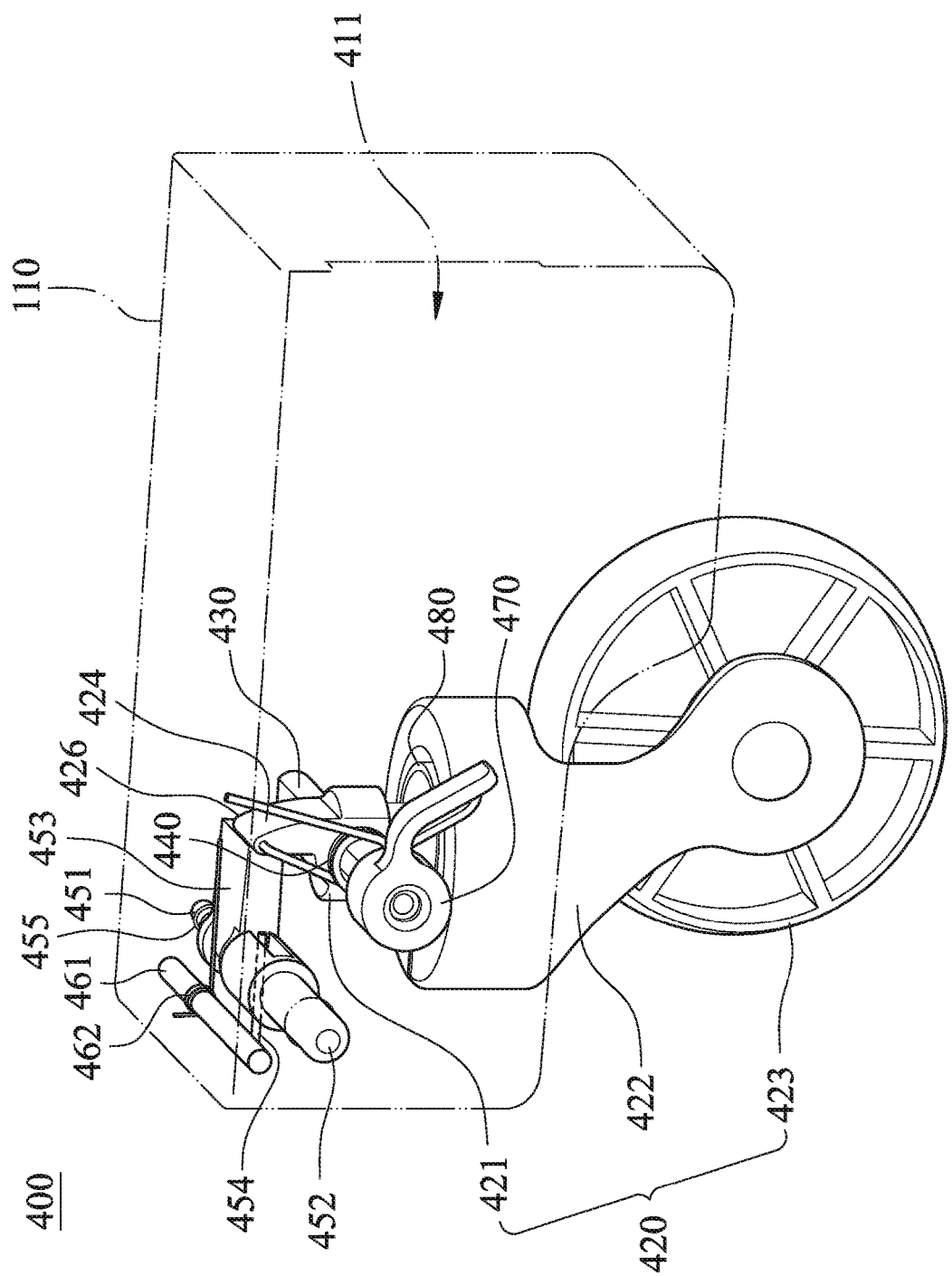
FIG. 15 is a schematic view of a telescoping wheel assembly according to a fifth embodiment of the present disclosure.
Figure 16:
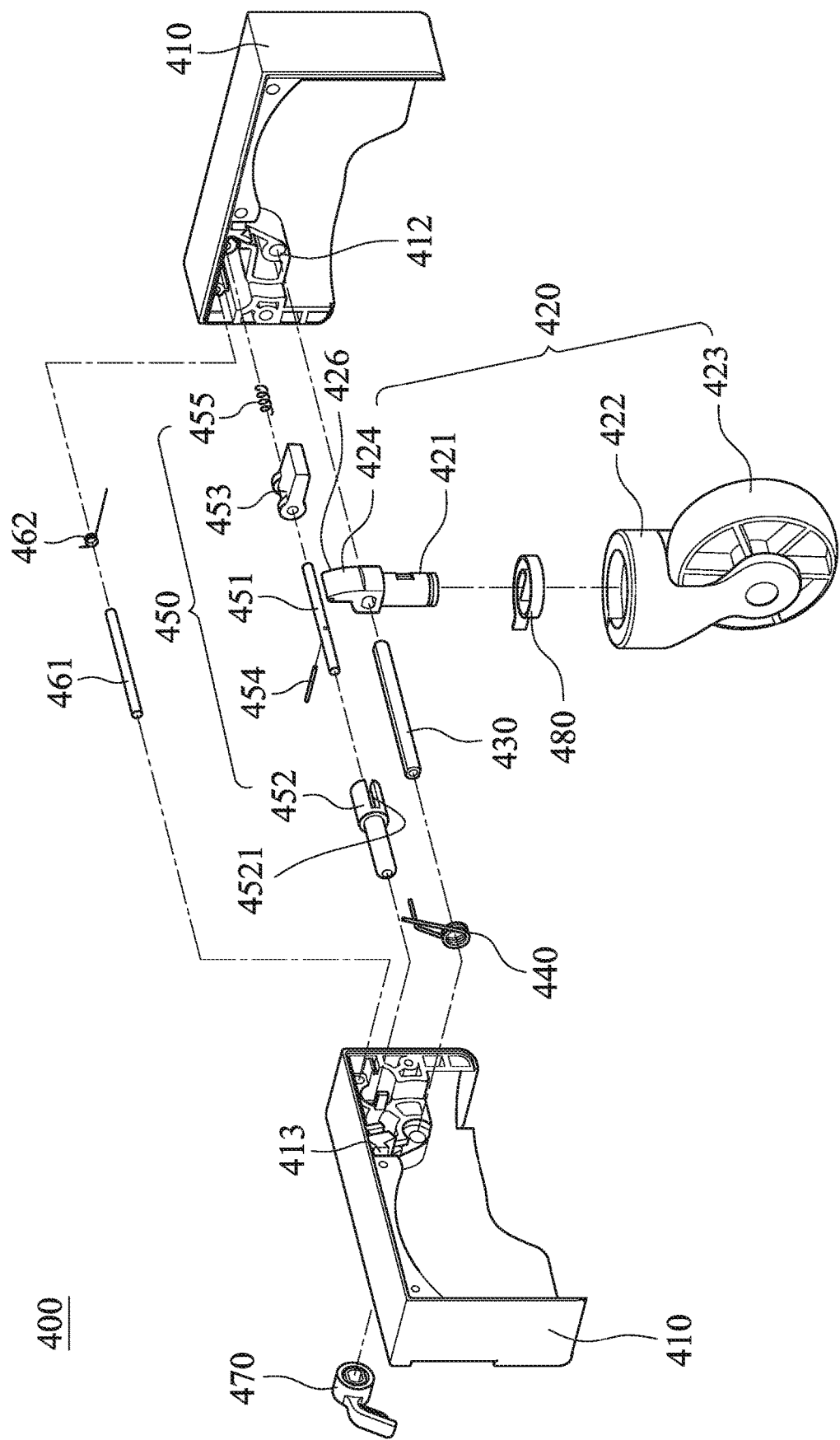
FIG. 16 is an exploded view of the telescoping wheel assembly according to FIG. 15.

FIG. 15 is a schematic view of a telescoping wheel assembly 400 according to an embodiment of the present disclosure. FIG. 16 is an exploded view of the telescoping wheel assembly 400 according to FIG. 15. In FIGS. 15 and 16, the telescoping wheel assembly 400 includes a base body 410, a wheel set 420, a pivoting axle 430, an elastic member 440 and a positioning element 453. The base body 410 includes a receiving groove 411. The wheel set 420 is disposed at the receiving groove 411 of the base body 410 and selectively positioned at an outward position (shown in FIG. 17) or an inward position (shown in FIG. 19) relative to the receiving groove 411. The wheel set 420 includes a wheel axle 421, a wheel base 422 and a wheel body 423. The wheel axle 421 is configured to position the wheel set 420 at the outward position or the inward position. The wheel base 422 is connected to the wheel axle 421. The wheel body 423 is connected to the wheel base 422. The pivoting axle 430 is pivotally connected to the base body 410 and connected to the wheel axle 421. The pivoting axle 430 links with the wheel axle 421 so as to position the wheel set 420 at the outward position or the inward position. The elastic member 440 is disposed in the receiving groove 411 and connected to the pivoting axle 430. One end of the elastic member 440 is connected to the wheel axle 421, and provides a recovery force for the wheel set 420 toward the inward position. The positioning element 453 is disposed in the receiving groove 411 and selectively abutted against the wheel axle 421. When the wheel set 420 is abutted by the positioning element 453, the wheel set 420 is positioned at the outward position. Therefore, the wheel set 420 can be pivoted via the pivoting axle 430 and selectively positioned at the outward position or the inward position by the positioning element 453 and the recovery force provided by the elastic member 440. Because of the elastic member 440, the telescoping wheel assembly 400 can buff the external force. Therefore, the telescoping wheel assembly 400 can avoid the wheel set 420 from being damaged and stores conveniently.

The telescoping wheel assembly 400 further includes a positioning set 450. The positioning set 450 is dispose in the receiving groove 411, and includes a rod 451, a button 452 and the positioning element 453. The rod 451 is disposed at the base body 410. The button 452 is connected to the rod 451. The button 452 is passed through and extended out from the base body 410. The positioning element 453 is passed through by the rod 451.

In some embodiments, one end of the pivoting axle 430 is disposed in a positioning hole 412 of the base body 410. The other end of the pivoting axle 430 passes through and extended out from the base body 410, so that the pivoting axle 430 can pivots relative to the base body 410. The pivoting axle 430 passes through and connected to the wheel axle 421. Therefore, the pivoting axle 430 can links with the wheel axle 421 so as to pivot the wheel axle 421 relative to the base body 410.

The elastic member 440 can be a twist spring and surrounded to the pivoting axle 430, but is not limited thereto. One side of the elastic member 440 is connected to an abutted end 424 of the wheel axle 421. The other side of the elastic member 440 is disposed at the positioning hole 413 of the base body 410. In other words, the other side of the elastic member 440 is limited by the positioning hole 413. Therefore, when the elastic member 440 is abutted by the positioning element 453 and twisted, the elastic member 440 can provides the recovery force to the wheel axle 421 and pivots the wheel axle 421 relative to the base body 410. Moreover, when the wheel set 420 is hit by the external force, the elastic member 440 can provides a buffering elastic force. The buffering elastic force can buff the external force so as to avoid the wheel set 420 can buff the external force damaged.

Figure 17:
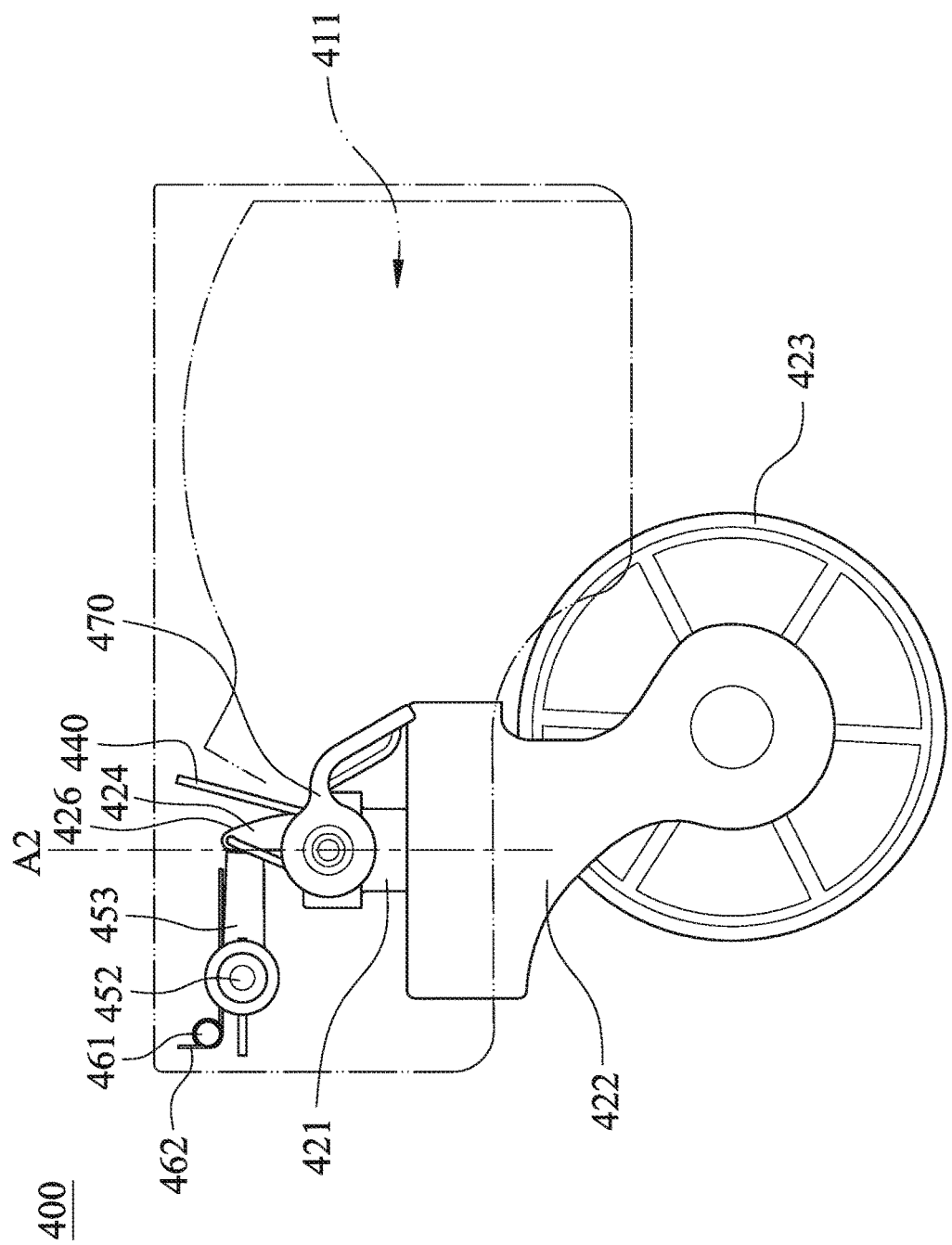
FIG. 17 is a side view of a second status of the telescoping wheel assembly according to FIG. 15.
Figure 18:
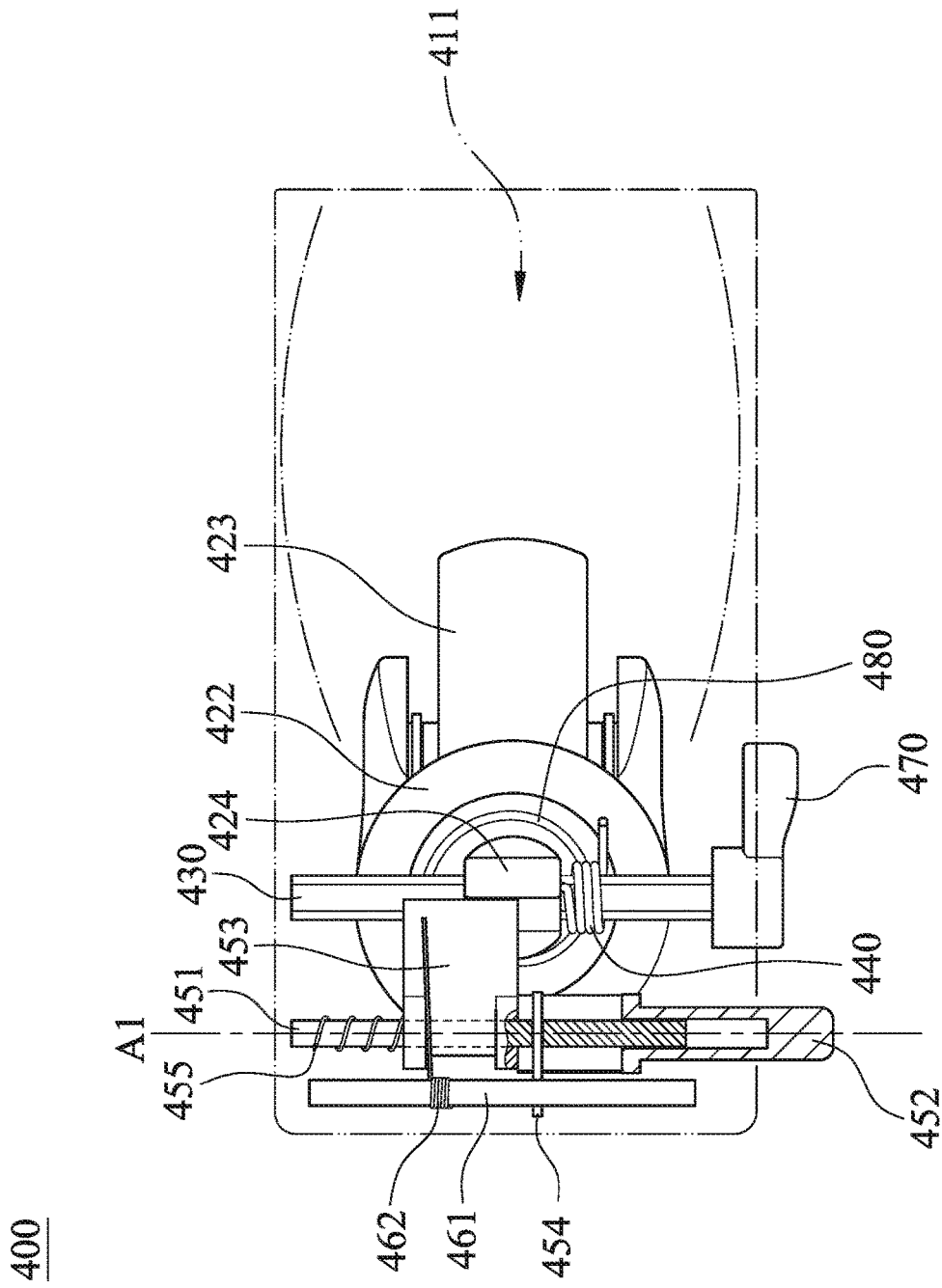
FIG. 18 is a top view of the telescoping wheel assembly according to FIG. 15.

FIG. 17 is a side view of a second status of the telescoping wheel assembly 400 according to FIG. 15. FIG. 18 is a top view of the telescoping wheel assembly 400 according to FIG. 15. In FIGS. 17 and 18, when the wheel set 420 of the telescoping wheel assembly 400 is positioned at the outward position, the abutted end 424 of the wheel axle 421 is abutted by one end of the positioning element 453. In other words, when the elastic member 440 is compressed by the positioning element 453, the elastic member 440 is the compressing status and the wheel set is positioned at the outward position.

Figure 19:
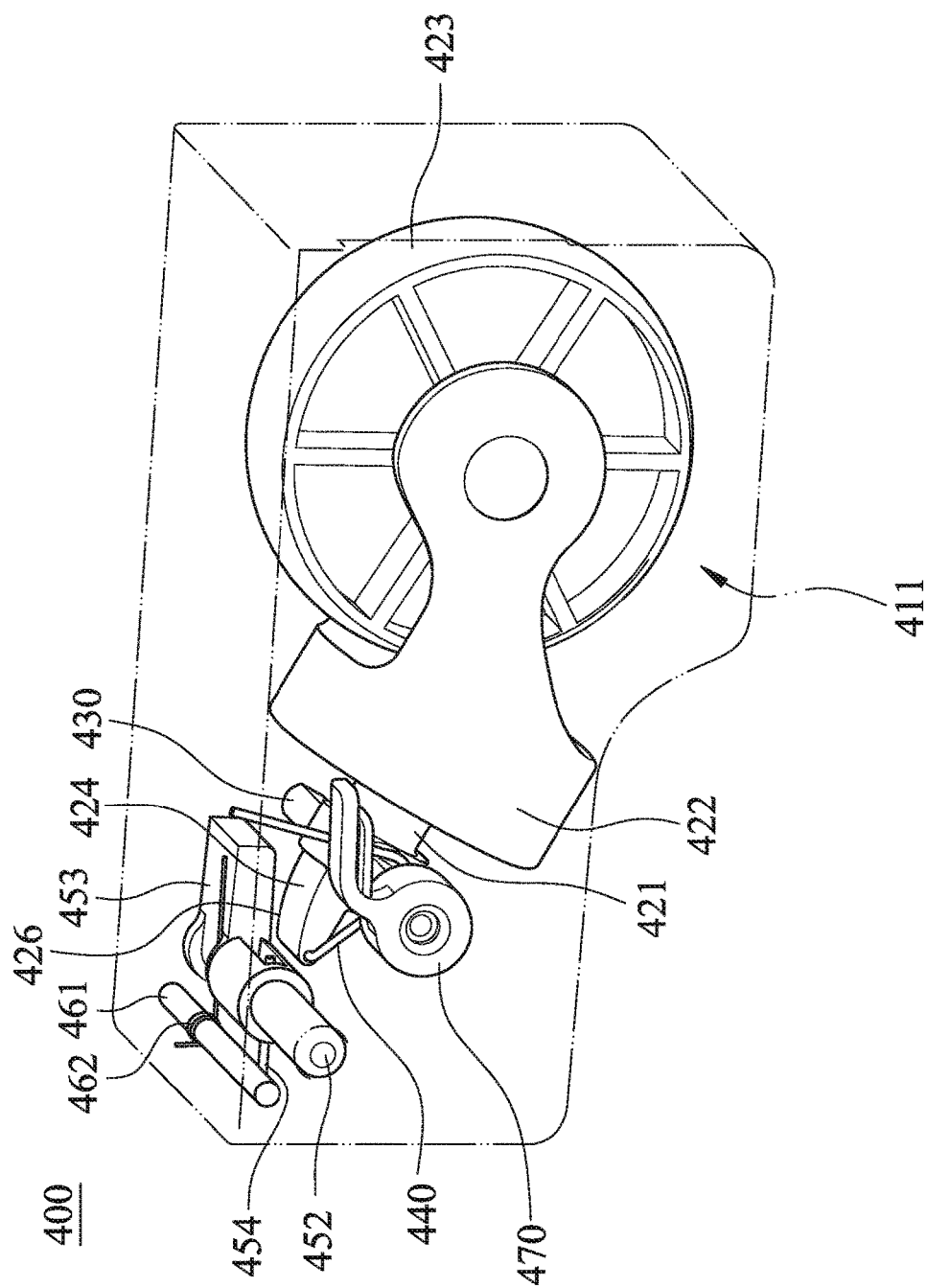
FIG. 19 is one schematic view of a first status of the telescoping wheel assembly according to FIG. 15.
Figure 20:
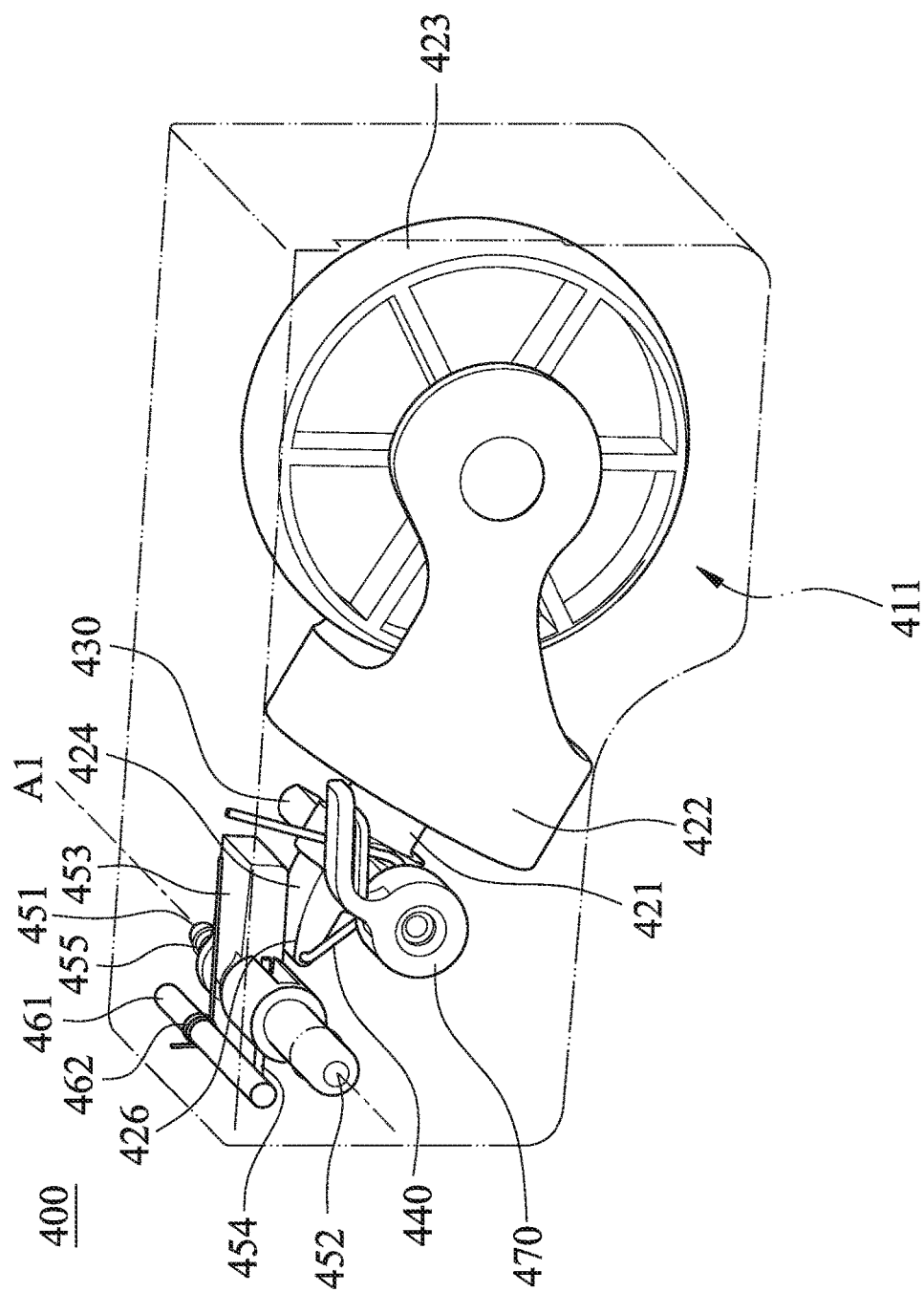
FIG. 20 is another one schematic view of a first status of the telescoping wheel assembly according to FIG. 15.

FIG. 19 is one schematic view of a first status of the telescoping wheel assembly 400 according to FIG. 15. FIG. 20 is another one schematic view of a first status of the telescoping wheel assembly 400 according to FIG. 15. In FIGS. 17 and 18, the wheel axle 421 is abutted by the positioning element 453 and positioned at the outward position. In FIGS. 19 and 20, when the button 452 is forced along an axle direction A1 of the rod 451 and pushed the positioning element 453, the positioning element 453 is displaced and detached from the abutted end 424 of the wheel axle 421 along the axle direction A1, and then the wheel set 420 is adjusted to the inward position by the recovery force.

In other words, the user can push the button 452 so as to detach the positioning element 453 and the wheel set 420 and adduct the wheel set 420 into the receiving groove 411. More clearly, please refer to FIG. 18, the button 452 is surrounded to one end of the rod 451 which is protracted from the base body 410, and the button 452 is configured to push by the user. One end of the button 452 is abutted against one side of the positioning element 453.

The positioning set 450 further includes a positioning spring 455. The positioning spring 455 is connected to the rod 451 and provides a first resetting elastic force to the positioning element 453 so as to position the positioning element 453 at a fixing position, as shown in FIGS. 17 and 18. When the button 452 is pushed along the axle direction A1 of the rod 451, the positioning element 453 is pushed by the button 452 along the axle direction A1 of the rod 451 toward a direction of the positioning spring 455, and then the positioning element 453 is displaced toward the direction of the positioning spring 455 and compressed the positioning spring 455 so as to detach the positioning element 453 and the abutted end 424 of the wheel axle 421. When the abutted end 424 of the wheel axle 421 does not abutted by the positioning element 453 and the elastic member 440 does not compressed by the positioning element 453, the elastic member 440 is released and provides the recovery force to the wheel axle 421. Therefore, the abutted end 424 of the wheel axle 421 is linked with the elastic member 440 so as to displace the wheel base 422 and the wheel body 423 into the receiving groove 411 so as to position the wheel set 420 at the inward position. In other words, the telescoping wheel assembly 400 is adjusted from the second status to the first status.

The positioning set 450 further includes a limiting plug 454. The limiting plug 454 is passed through the rod 451 along a limiting direction which is vertical to the axle direction A1 of the rod 451. Therefore, when the button 452 is pushed and displaced, the limiting plug 454 can limits the button 452 displaced. The positioning spring 455 is surrounded to the rod 451. One end of the positioning spring 455 is abutted against the base body 410. The other end of the positioning spring 455 is abutted against the other side of the positioning element 453. In some embodiments, when the positioning element 453 is pushed by the button 452 along the axle direction A1 of the rod 451 toward the positioning spring 455, the positioning element 453 is displaced toward the positioning spring 455 and compressed the positioning spring 455, and then the limiting plug 454 can clasped to an abutted slot 4521 of the button 452 so as to limit the button 452 displaced.

The telescoping wheel assembly 400 further includes a limiting rod 461 and a limiting spring 462. The limiting rod 461 is disposed at the base body 410. The limiting spring 462 is connected to the limiting rod 461. One end of the limiting spring 462 is connected to the positioning element 453 so as to provide a second resetting elastic force to the positioning element 453 and position the positioning element 453 at a fixing position. Therefore, when the positioning element 453 abutted against the wheel axle 421, because of the first resetting elastic force provided by the positioning spring 455 and the second resetting elastic force provided by the limiting spring 462, the positioning element 453 can be positioned at the fixing position and the truly abutted against the wheel axle 421 so as to improve a stability of the telescoping wheel assembly 400.

Moreover, when the button 452 pushes the positioning element 453, as shown in FIG. 19, the positioning element 453 is detached from the wheel axle 421 and the positioning spring 455 is compressed by the positioning element 453. Please refer to FIG. 20, when the telescoping wheel assembly 400 is the first status and the button 452 does not be forced, the positioning spring 455 is released and provides the first resetting elastic force to the positioning element 453. A direction of the first resetting elastic force is parallel to the axle direction A1 of the rod 451 so as to position the positioning element 453 to the fixing position. Further, when the limiting spring 462 is unforced, because of the second resetting elastic force which is provided by the limiting spring 462, the positioning element 453 can be stably positioned at the fixing position. In FIG. 20, when the wheel set 420 is positioned at the inward position, one face of the positioning element 453 is abutted by the abutted end 424 of the wheel axle 421. Therefore, the positioning element 453 can be stably positioned the wheel set 420 at the inward position.

Moreover, telescoping wheel assembly 400 further includes a pivoting element 470. The pivoting element 470 is connected to the pivoting axle 430 and extended out from the base body 410 so as to rotate the pivoting axle 430 so as to adjust the wheel set 420 at the outward position or the inward position. In some embodiments, when the wheel set 420 of the telescoping wheel assembly 400 is adjusted from the inward position to the outward position, the user rotates the pivoting element 470 so as to rotate the pivoting axle 430 relative to the base body 410 and links with the wheel axle 421. The abutted end 424 of the wheel axle 421 has an arc structure. The arc structure is displaced along one side of the positioning element 453. In other words, the pivoting axle 430 links with the wheel axle 421 so that the positioning element 453 is pushed by the wheel axle 421 along the arc structure of the abutted end 424 so as to pivot the positioning element 453 and compress the limiting spring 462. When the arc structure of the abutted end 424 is displaced to one end of the positioning element 453 (shown in FIG. 17), the limiting spring 462 is released and provides the second resetting elastic force to the positioning element 453 so that the positioning element 453 is stably abutted against the abutted end 424 of the wheel axle 421.

Another aspect, the wheel base 422 is connected to the wheel body 423, and the wheel body 423 is a spherical wheel, but is not limited thereto. The wheel base 422 is pivoted along an axle direction A2 of the wheel axle 421. In other words, the wheel base 422 can links with the wheel body 423 so as to pivot 360 degrees along the axle direction A2 of the wheel axle 421. When the wheel set 420 is positioned at the inward position, the wheel body still can be rotated so that the wheel body 423 can be rotated, when the telescoping wheel assembly 400 is the first status. Therefore, the wheel set 420 of the telescoping wheel assembly 400 does not be limited by an angle, so that a convenience of the telescoping wheel assembly 400 can be improved.

The telescoping wheel assembly 400 further includes a rotating spring 480. One end of the rotating spring 480 is connected to the wheel axle 421. The other end of the rotating spring 480 is connected to the wheel base 422 and provides a spring force to the wheel base 422 toward an original angle (shown in FIG. 15). In some embodiments, the rotating spring 480 is a volute spring. One end of the rotating spring 480 is connected to a wheel axle hole 425 of the wheel axle 421. The other side of the rotating spring 480 is connected to the wheel base 422. Therefore, when the wheel body 423 is forced, the wheel body 423 can links with the wheel base 422 so as to pivot on the axle direction A2 of the wheel axle 421. When the wheel base 422 is unforced, because of the spring force provided by the rotating spring 480, the wheel base 422 can stably positioned at the original angle. When the wheel set 420 is unforced and the wheel base 422 is unforced by pivoting, the wheel base 422 is at the original angle.

Figure 21:
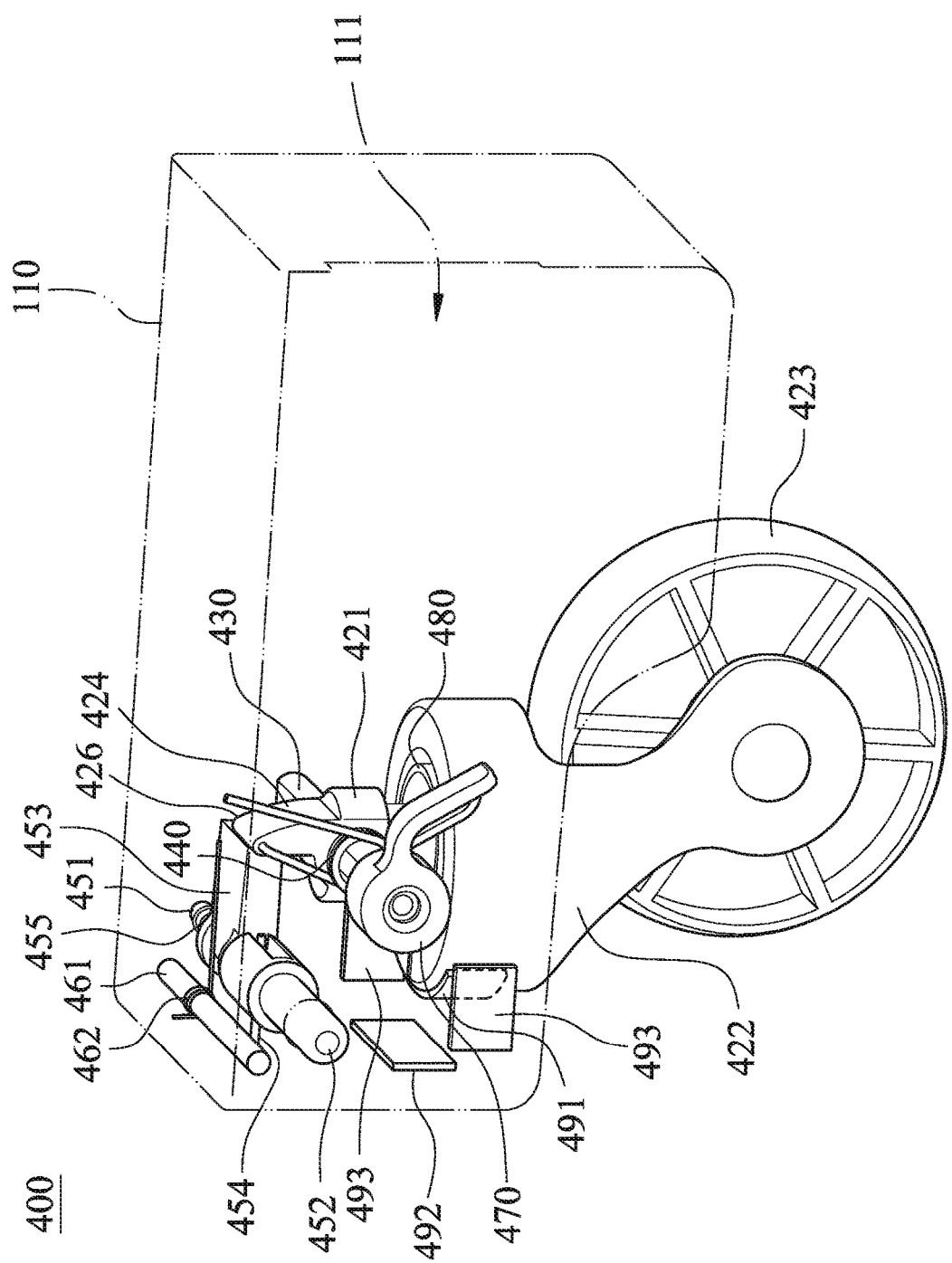
FIG. 21 is a schematic view of a telescoping wheel assembly according to a sixth embodiment of the present disclosure.

FIG. 21 is a schematic view of the telescoping wheel assembly 400 according to the sixth embodiment of the present disclosure. The difference between the sixth embodiment of FIG. 21 and the fifth embodiment of FIG. 15 is the telescoping wheel assembly 400 further includes a positioning magnetic element 491, a magnetic unit 492 and a diamagnetic element 493. The positioning magnetic element 491 is disposed at the wheel base 422. The magnetic unit 492 is disposed at an inner wall of the base body 410, and a polarity of the magnetic unit 492 and the positioning magnetic element 491 are different so as to provide an attracting force to the positioning element 491. In FIG. 7, a number of the diamagnetic element 493 is 2, but is not limited thereto. The diamagnetic elements 493 are disposed at two sides of the inner wall of the wheel base 410, respectively. A polarity of the diamagnetic element 493 is same as the positioning magnetic element 491 so as to provide a repulsion force to the positioning magnetic element 491. Because of the attracting force provided by the magnetic unit 492 and the repulsion force provided by the diamagnetic element 493, the wheel base 422 can is positioned at the original angle.

In some embodiments, the polarity of the positioning magnetic element 491 is S pole, the polarity of the magnetic unit 492 is N pole and the polarity of the diamagnetic element 493 is S pole, but is not limited thereto. The magnetic unit 492 is faced to the positioning magnetic element 491. The diamagnetic elements 493 are disposed at two sides of the inner wall of the wheel base 410, respectively. When the wheel body 423 is forced and overcomes the repulsion force between the diamagnetic element 493 and the positioning magnetic element 491, the wheel base 422 is pivoted on the axle direction A2 of the wheel axle 421. When the wheel body 423 is unforced, because of the attracting force between the positioning magnetic element 491 and the magnetic unit 492, and the repulsion force between the diamagnetic element 493 and the positioning magnetic element 491, the wheel base 492 is pivoted to the original angle. Therefore, the wheel base 422 and the wheel body 423 can stably positioned at the original angle. In other words, when the wheel set 420 is positioned at the outward position or positioned at the inward position, the wheel base 422 can be stably positioned at the original angle, so that a stability of the telescoping wheel assembly 400 can be increased.

Figure 22:
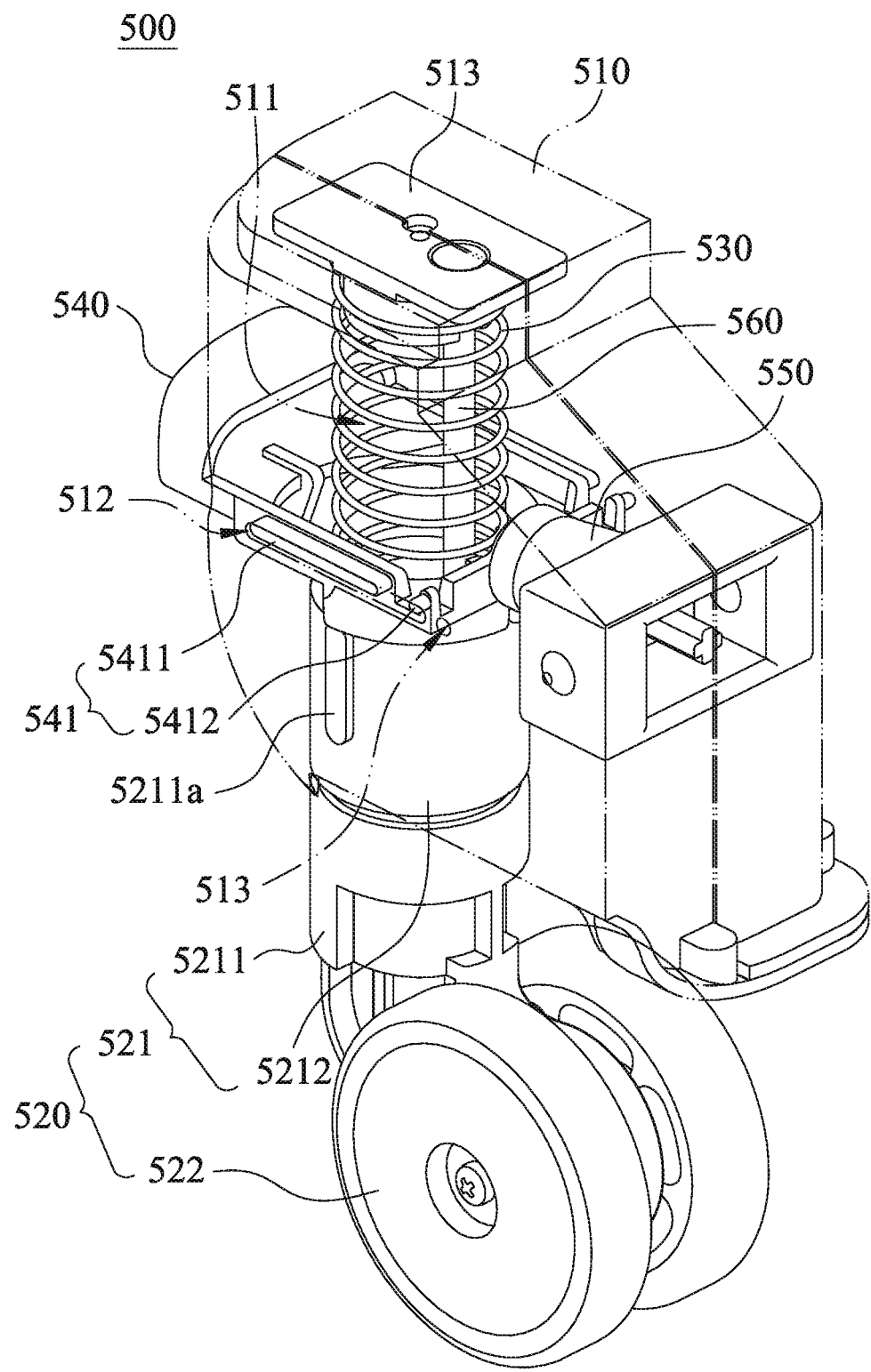
FIG. 22 is a schematic view of a protruding status of a button of a telescoping wheel assembly according to a seventh embodiment of the present disclosure.
Figure 23:
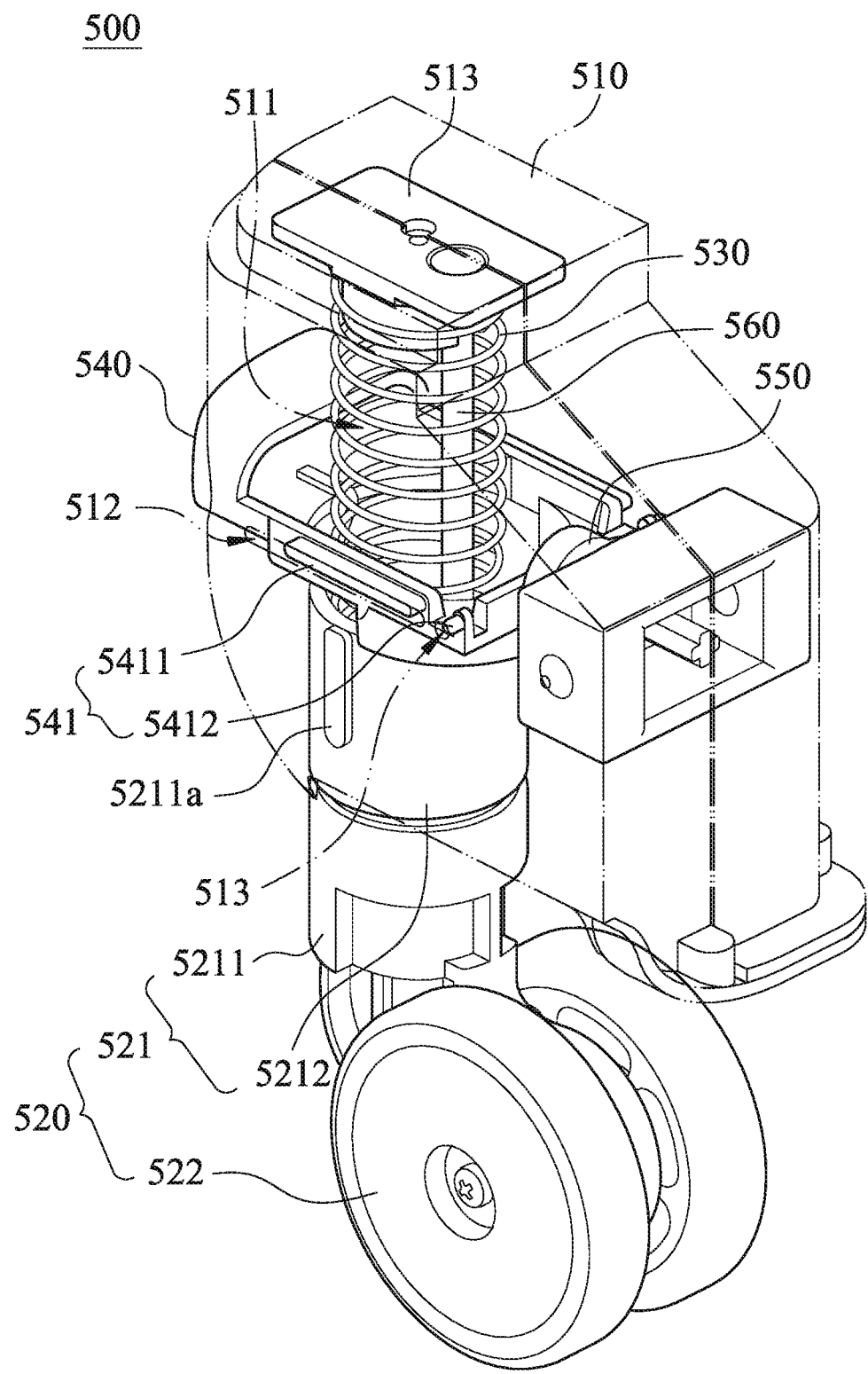
FIG. 23 is a schematic view of an adducting status of the button of the telescoping wheel assembly according to FIG. 22.
Figure 24:
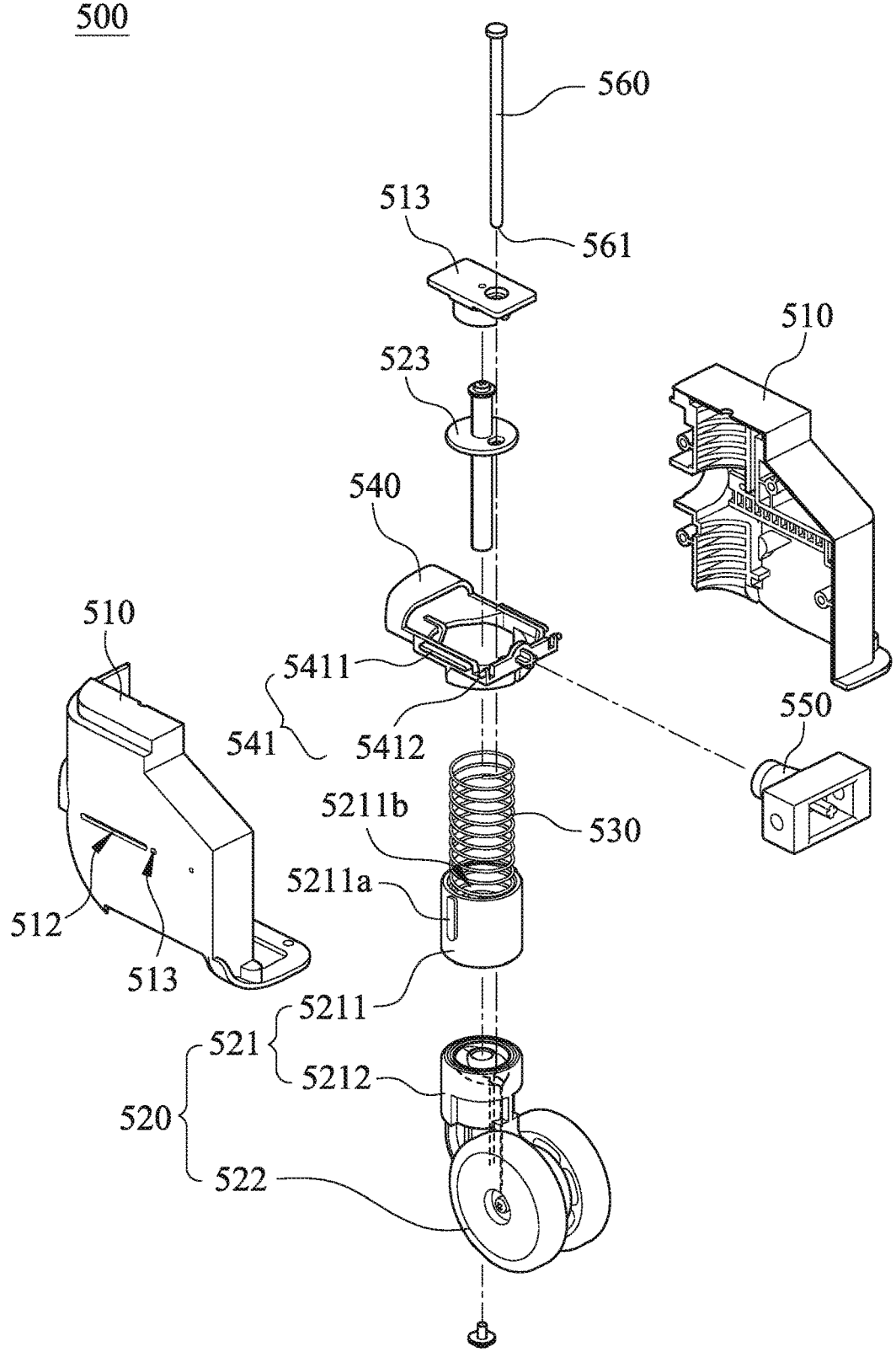
FIG. 24 is an exploded view of the telescoping wheel assembly according to FIG. 22.
Figure 25:
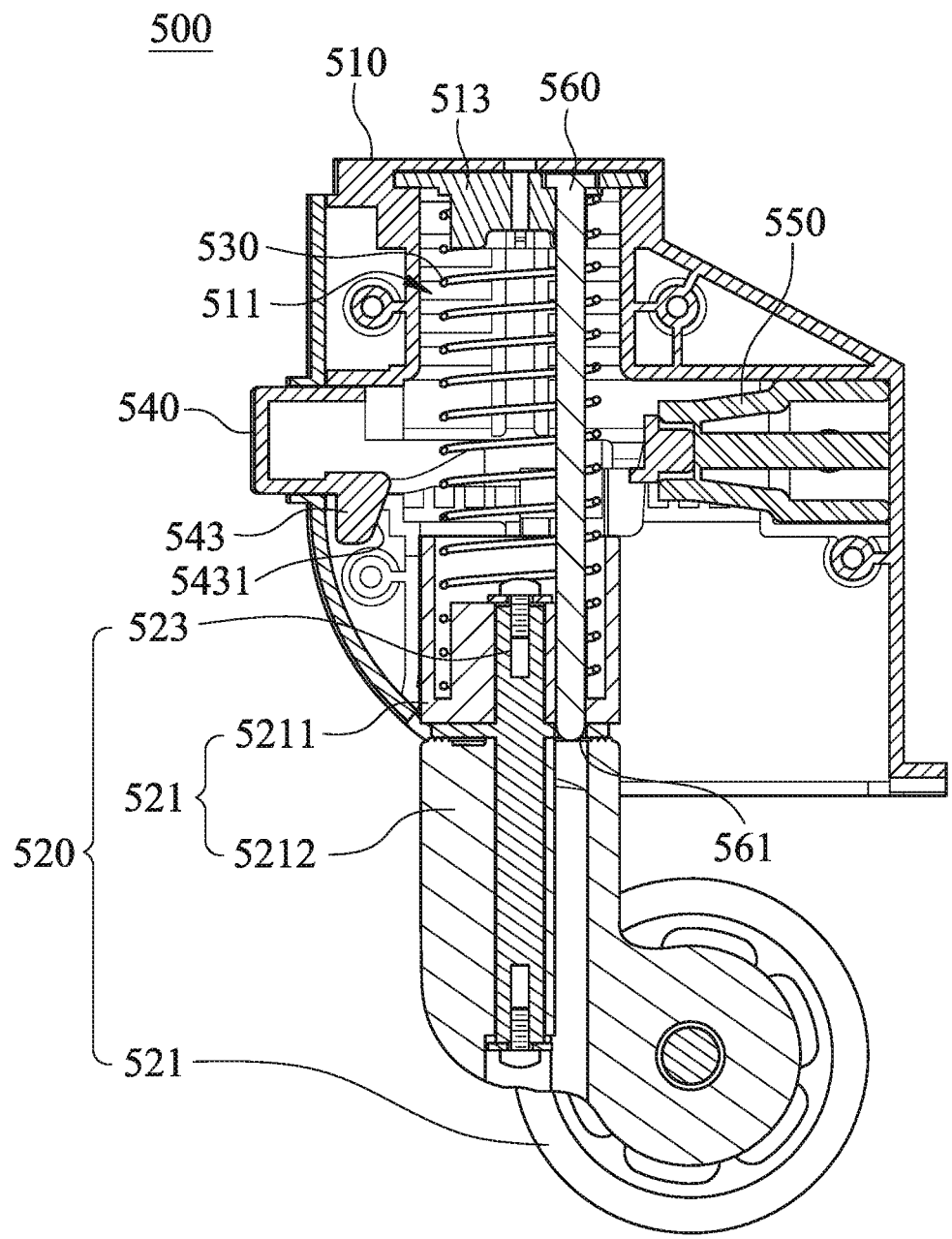
FIG. 25 is a cross-sectional view of the protruding status of the button of a second status of the telescoping wheel assembly according to FIG. 22.
Figure 26:
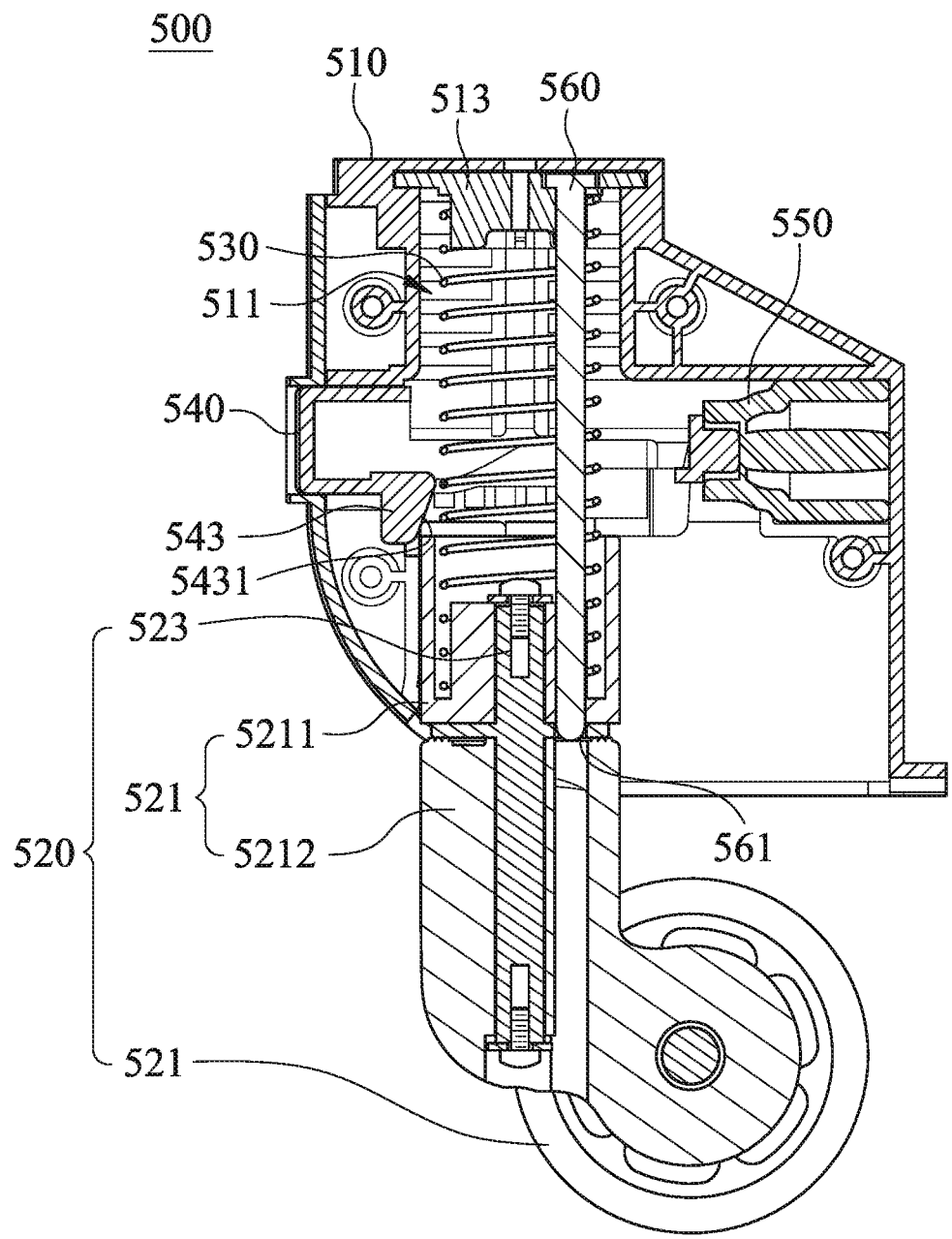
FIG. 26 is a cross-sectional view of the adducting status of the button of the second status of the telescoping wheel assembly according to FIG. 22.
Figure 27:
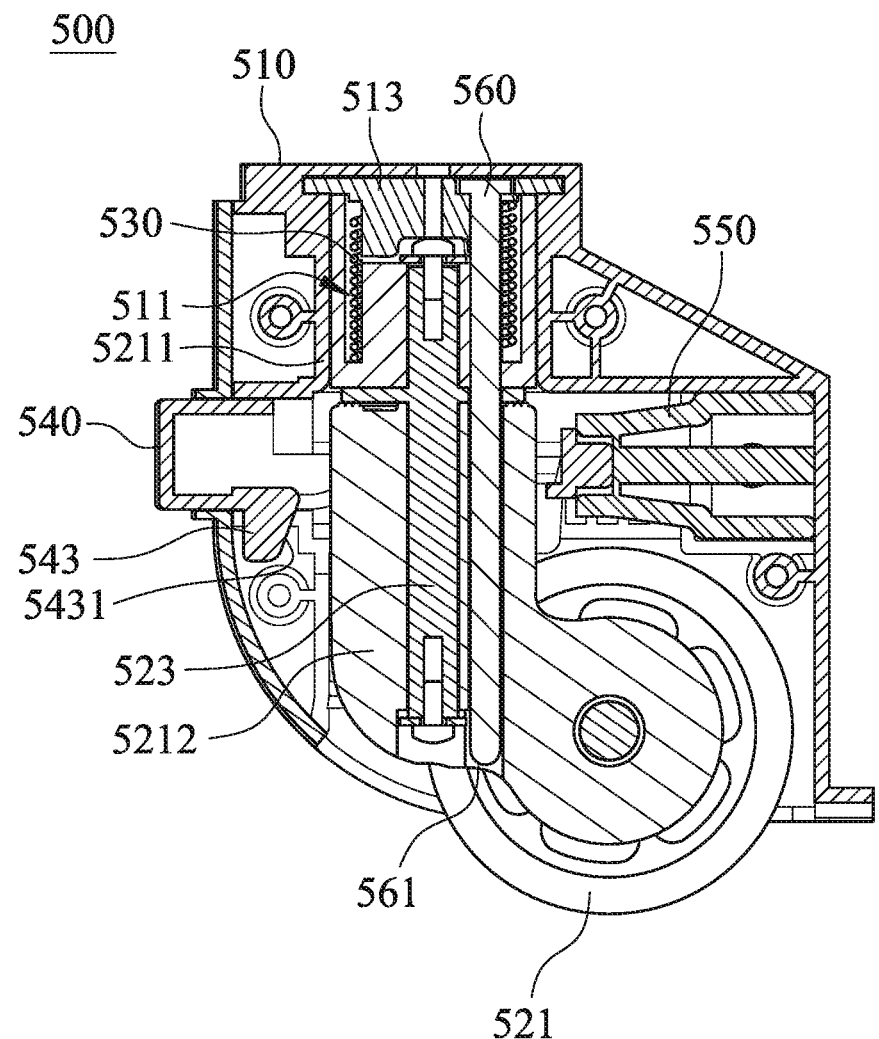
FIG. 27 is a cross-sectional view of a first status of the telescoping wheel assembly according to FIG. 22.

FIG. 22 is a schematic view of a protruding status of a button 540 of a telescoping wheel assembly 500 according to a seventh embodiment of the present disclosure. FIG. 23 is a schematic view of an adducting status of the button 540 of the telescoping wheel assembly 500 according to FIG. 22. FIG. 24 is an exploded view of the telescoping wheel assembly 500 according to FIG. 22. FIG. 25 is a cross-sectional view of the protruding status of the button 540 of a second status of the telescoping wheel assembly 500 according to FIG. 22. FIG. 26 is a cross-sectional view of the adducting status of the button 540 of the second status of the telescoping wheel assembly 500 according to FIG. 22. FIG.

Figure 28:
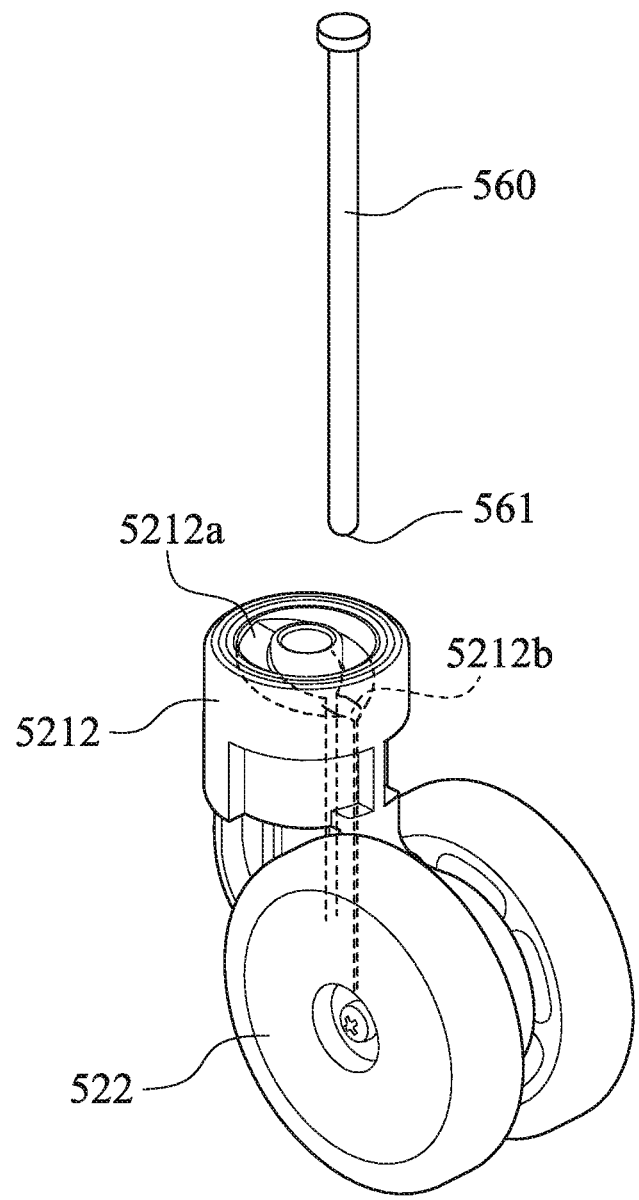
FIG. 28 is a schematic view showing a lower wheel axle and a guiding axle member of the telescoping wheel assembly according to FIG. 22.

27 is a cross-sectional view of a first status of the telescoping wheel assembly 500 according to FIG. 22. FIG. 28 is a schematic view of a lower wheel axle 5212 and a guiding axle member 560 of the telescoping wheel assembly 500 according to FIG. 22. In FIGS. 22-28, a telescoping wheel assembly 500 includes a base body 510, a wheel set 520 and an elastic member 530. The base body 510 includes a receiving groove 511. The wheel set 520 is connected to the receiving groove 511 and selectively positioned at an outward position or an inward position relative to the receiving groove 511. The wheel set 520 includes a wheel axle 521 and a wheel body 522. The wheel body 522 is connected to an outside of the wheel axle 521. The elastic member 530 is disposed in the receiving groove 511 and abutted against the base body 510 and the wheel set 520.

The telescoping wheel assembly 500 further includes a button 540 and an elastic unit 550. The button 540 passes through the base body 510. The button 540 includes a protruding status or an adducting status relative to the receiving groove 511. The button 540 includes at least one first positioning unit 5411 and at least one second positioning unit 5412. The at least one second positioning unit 5412 is disposed at one side of the at least one first positioning unit 5411. The elastic unit 550 is disposed in the receiving groove 511 and abutted against the button 540 so as to adjust the button 540 from the adducting status to the protruding status. The base body 510 further includes at least one first button positioning slot 512 and at least one second button positioning slot 513. The at least one first positioning unit 5411 is movably disposed in the at least one first button positioning slot 512. The at least one second button positioning slot 513 is disposed at one side of the at least one first button positioning slot 512. The at least one second positioning unit 5412 is selectively disposed into the at least one second button positioning slot 512. The wheel axle 521 includes an upper wheel axle 5211 and a lower wheel axle 5212. The upper wheel axle 5211 includes at least one extended positioning portion 5211a. The at least one extended positioning portion 5211a is limited by the button 540 so as to position the wheel set 520. The lower wheel axle 5212 is pivotally connected to the upper wheel axle 5211. In FIG. 22, the number of the first positioning unit 5411 are 2, and the number of the first button positioning slot 512 are 2. The first positioning unit 5411 is respectively disposed in the first button positioning slot 512, so that the button 540 is the protruding status. In FIG. 23, a number of the second positioning unit 5412 are 2, and the second button positioning slot 513 are 2, and the second positioning unit 5412 is respectively disposed in the second button positioning slot 513, so that the button 540 is the adducting status. In some embodiments, the upper wheel axle 5211 further includes a receiving space 5211b. One end of the elastic member 530 is extended into the receiving space 5211b so as to effectively utilize the volume of the telescoping wheel assembly 500. The button 540 further includes a pushing portion 542 and a positioning fixing portion 544. When the second positioning unit 5412 of the button 540 is positioned at the first positioning unit 5411, the wheel set 520 can be positioned at the outward position or the inward position by the positioning fixing portion 544. When the user pushes the button 540 to adjust the button 540 from the protruding status to the adducting status, the elastic unit 550 is pushed by the pushing portion 542, and the second positioning unit 5412 of the button 540 is positioned into the second button position slot 513. Accordingly, the elastic unit 550 is compressed, and the extended positioning portion 5211a of the upper wheel axle 5211 of the wheel axle 521 of the wheel set 520 is not limited by the positioning fixing portion 544 of the button 540, as shown in FIG. 22, so as to adjust a position of the wheel set 520, such as the outward position or the inward position. Therefore, the wheel set 520 can be adjusted from the outward position to the inward position or from the inward position to the outward position. When the wheel set 520 is positioned at the outward position, the elastic member 530 provides a buffering elastic force to the wheel set 520. When the wheel set 520 is positioned at the inward position, the elastic member 530 provides a pushing elastic force to the wheel set 520. Moreover, when the second positioning unit 5412 is detached from the second button position slot 513, the elastic unit 550 can provide a pushing force to the pushing portion 542 of the button 540 so as to adjust the button 540 from the adducting status to the protruding status.

The button 540 further includes an adjusting block 543. When the adjusting block 543 is pushed by the wheel set 520, the at least one second positioning unit 5412 is detached from the at least one second button positioning slot 513, and the elastic unit 550 provides the pushing force to the button 540 so as to adjust the button 540 from the adducting status to the protruding status. In some embodiments, the adjusting block 543 includes a bevel portion 5431. When the button 540 is the adducting status, the wheel set 520 is pushed by the elastic member 530, so that the wheel set 520 is extended out of the base body 510. When the wheel set 520 is pushed by the external force from the usage environment, the bevel portion 5431 of the adjusting block 543 is abutted against by the upper wheel axle 5211 of the wheel axle 521, so that the second positioning unit 5412 is detached from the second button position slot. The extended positioning portion 5211a is limited by the positioning fixing portion 544 so as to position the wheel set 520 at the outward position. When the user pushes the wheel set 520 to adjust the wheel set 520 from outward position to the inward position, the bevel portion 5431 of the adjusting block 543 is abutted against by the upper wheel axle 5211 of the wheel axle 521, so that the second positioning unit 5412 is detached from the second button position slot, and the wheel set 520 is positioned at the inward position by the positioning fixing portion 544. In other words, when the external force is not enough to push the wheel set 520 from outward position to the inward position, the extended positioning portion 5211a would be limited by the positioning fixing portion 544 so as to position the wheel set 520 at the outward position. Therefore, the wheel set 520 can be firmly positioned at the outward position or the inward position by the positioning fixing portion 544 of the button 540.

The telescoping wheel assembly 500 further includes a guiding axle member 560. The guiding axle member 560 is disposed in the receiving groove 511, and the upper wheel axle 5211 is passed through by the guiding axle member 560. The lower wheel axle 5212 includes a guiding bevel face 5212a and a guiding hole 5212b. The guiding hole 5212b is disposed at the guiding bevel face 5212a. When the wheel set 520 is positioned at the inward position, the guiding hole 5212b is passed through by the guiding axle member 560 so as to guide the lower wheel axle 5212. In some embodiments, the base body 510 further includes a fixing unit 513. The fixing unit 513 is disposed at a top side of the receiving groove 511 for fixing the guiding axle member 560, and the other end of the elastic member 530 is abutted against the fixing unit 513. The wheel set 520 further includes a connecting element 523. The connecting element 523 passes through the upper wheel axle 5211 and the lower wheel axle 5212 so as to connect the upper wheel axle 5211 and the lower wheel axle 521. The connecting element 523 includes a fixing hole 5231. The guiding axle member passes through the fixing hole 5231 of the connecting element 523 and the upper wheel axle 5211 so as to fix the upper wheel axle 5211, so that the lower wheel axle 5212 can pivotally connected to the upper wheel axle 5211. Moreover, the guiding axle member 560 includes a guiding end 561. When the user pushes the wheel set 520 to adjust the wheel set 520 from outward position to the inward position, the guiding end 561 of the guiding axle member 560 would be abutted against the guiding bevel face 5212a so as to guide the lower wheel axle 5212 to a receiving direction. When the wheel set 520 is guided to the receiving direction, the guiding end 561 of the guiding axle member 560 would pass through the guiding hole 5212b so as to receive the wheel set 520 into the base body 510.

Figure 29:
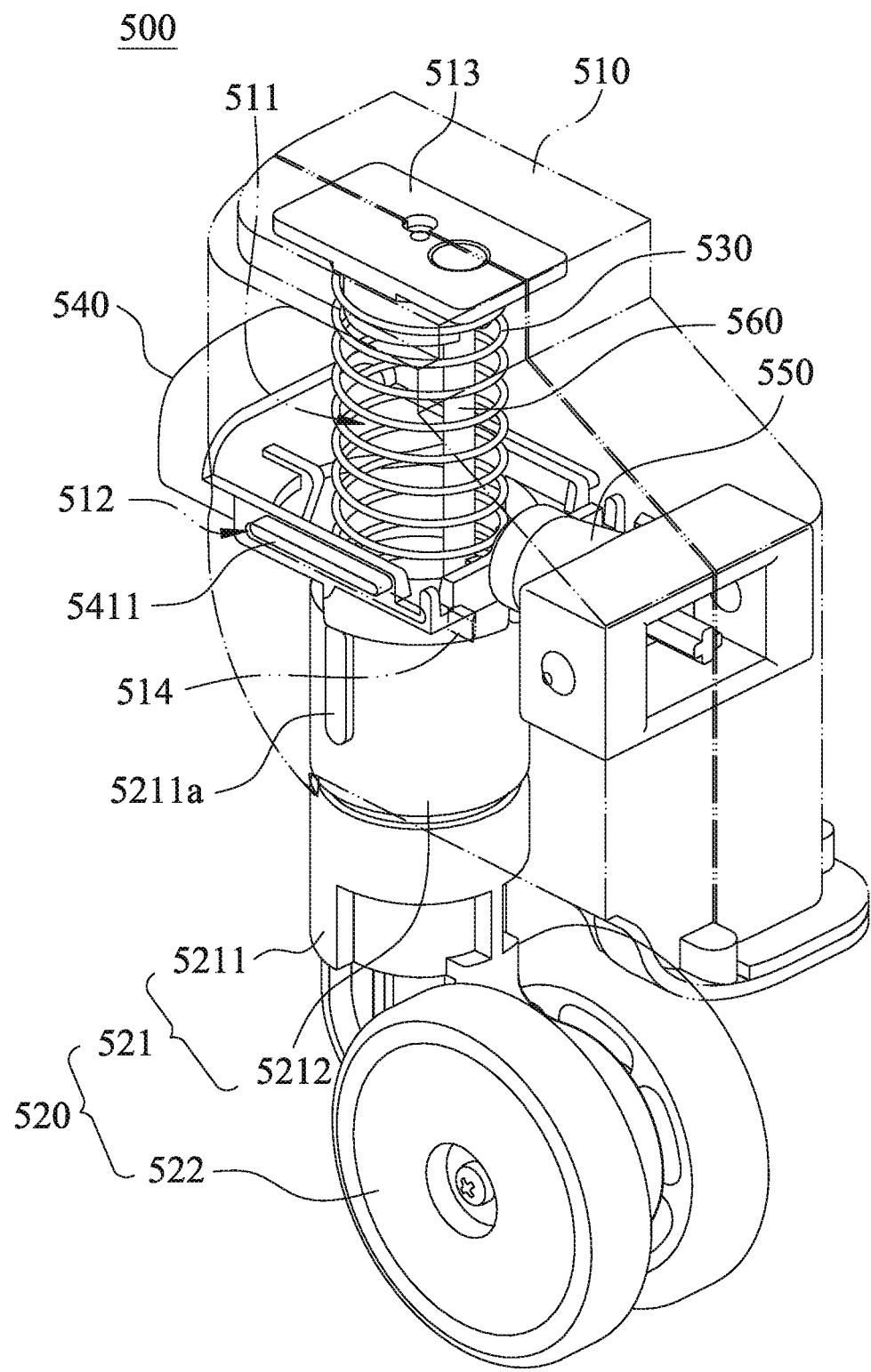
FIG. 29 is a schematic view of a protruding status of a button of a telescoping wheel assembly according to an eighth embodiment of the present disclosure.

FIG. 29 is a schematic view of a protruding status of a button 540 of a telescoping wheel assembly 500 according to an eighth embodiment of the present disclosure. The difference between the eight embodiment of FIG. 29 and the seven embodiment of FIG. 22 is the telescoping wheel assembly 500 of FIG. 29 without the at least one second positioning unit and the at least one second button positioning slot. The telescoping wheel assembly 500 of FIG. 29 further includes at least one delay element 514. The at least one delay element 514 is disposed at one side of the at least one first button positioning slot 512 and corresponding to the elastic unit 550 so as to delay the button 540 adjusting from the adducting status to the protruding status. The at least one delay element 514 can be a rubber, but is not limited thereto.

In some embodiments, when the button 540 is pushed by the user, the button 540 is adjusted from the protruding status to the adducting status and limited by the at least one delay element 514. However, the elastic element 550 can provide the pushing force to the button 540 so as to detach the button 540 from the at least one delay element 514 and adjust to the protruding status for positioning the wheel set 520 at the outward position or the inward position. Therefore, when the user pushes the button 540 to adjust the telescoping wheel assembly 500 from first status to the second status or adjust the telescoping wheel assembly 500 from second status to the first status, the delay element 514 can delay the button 540 adjusting to the protruding status.

Figure 30:
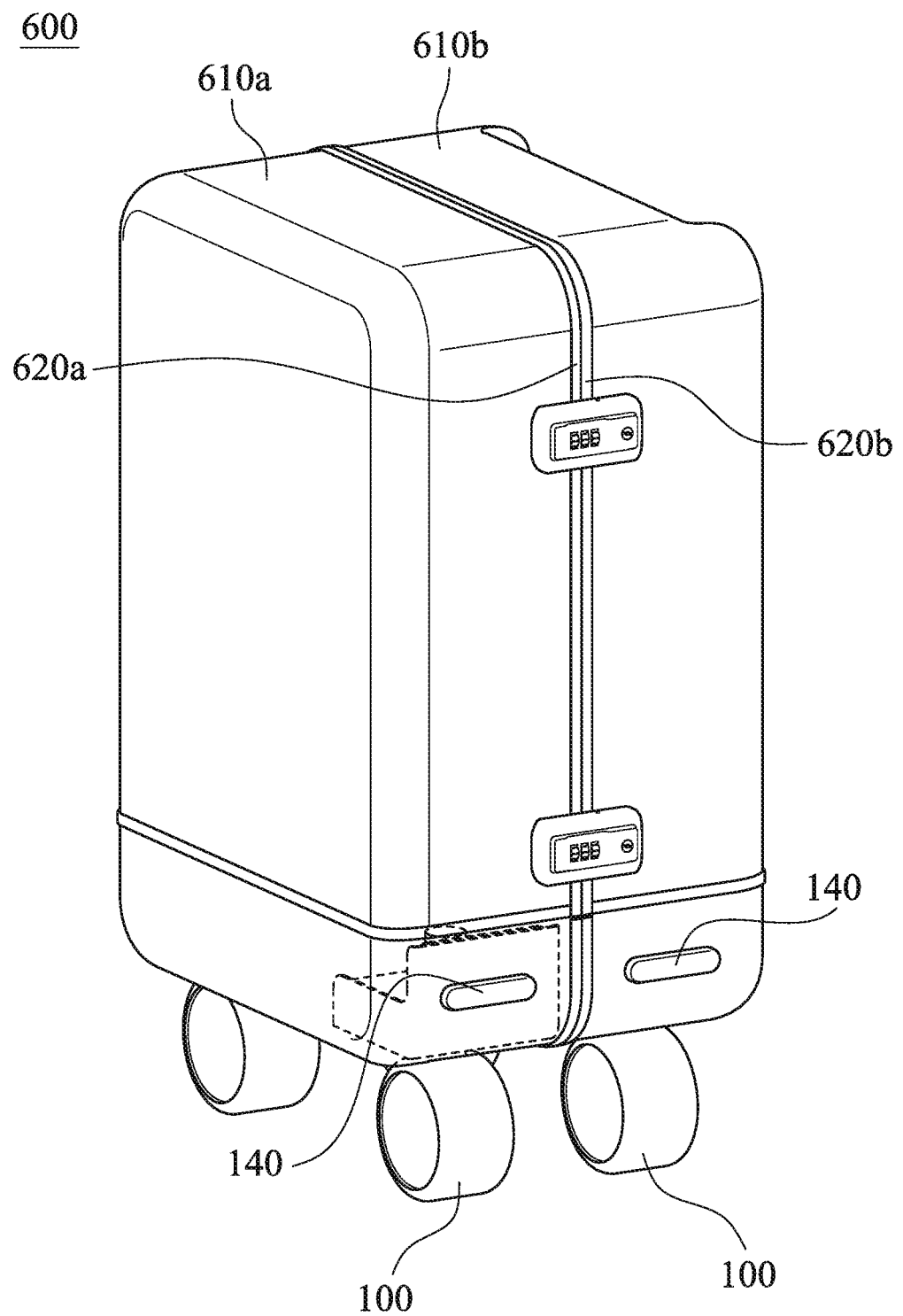
FIG. 30 is a schematic view of a telescoping wheel box according to a nine embodiment of the present disclosure.
Figure 31:
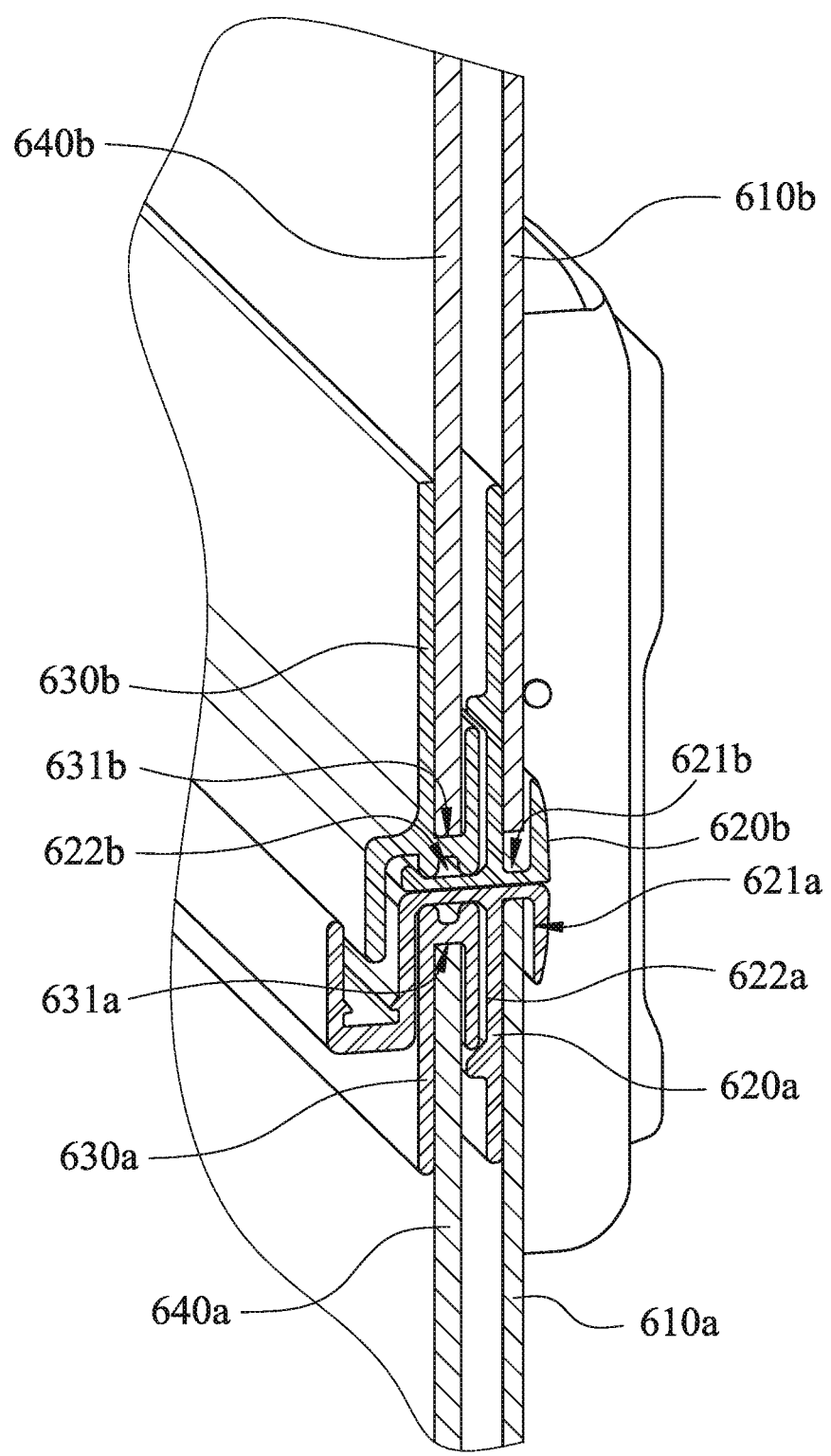
FIG. 31 is a cross-sectional view of an outer frame portion and an inner frame portion of the telescoping wheel box 600 according to FIG. 30.
Figure 32:
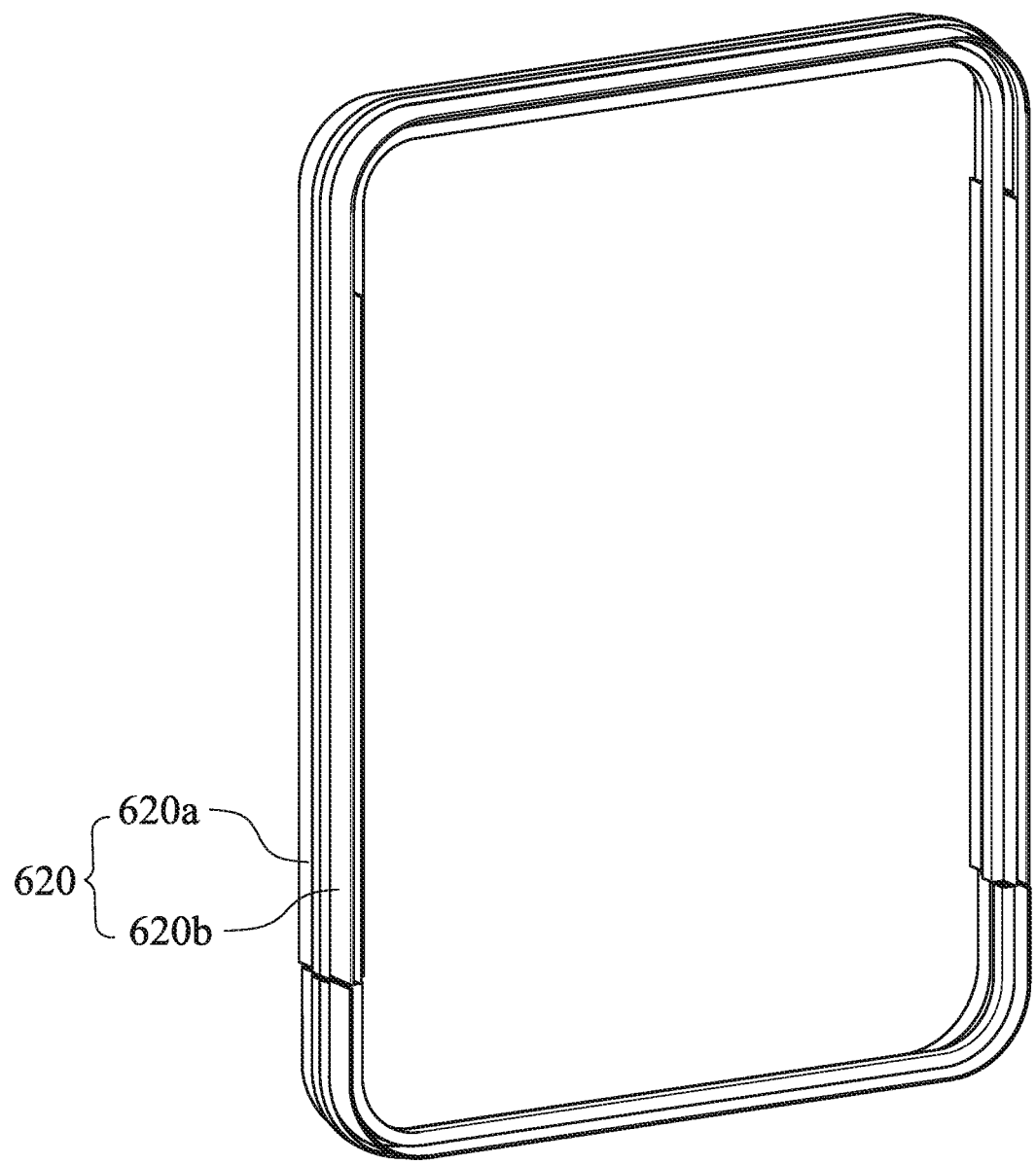
FIG. 32 is a schematic view of a first mode of the frame portion of the telescoping wheel box according to FIG. 30.
Figure 33:
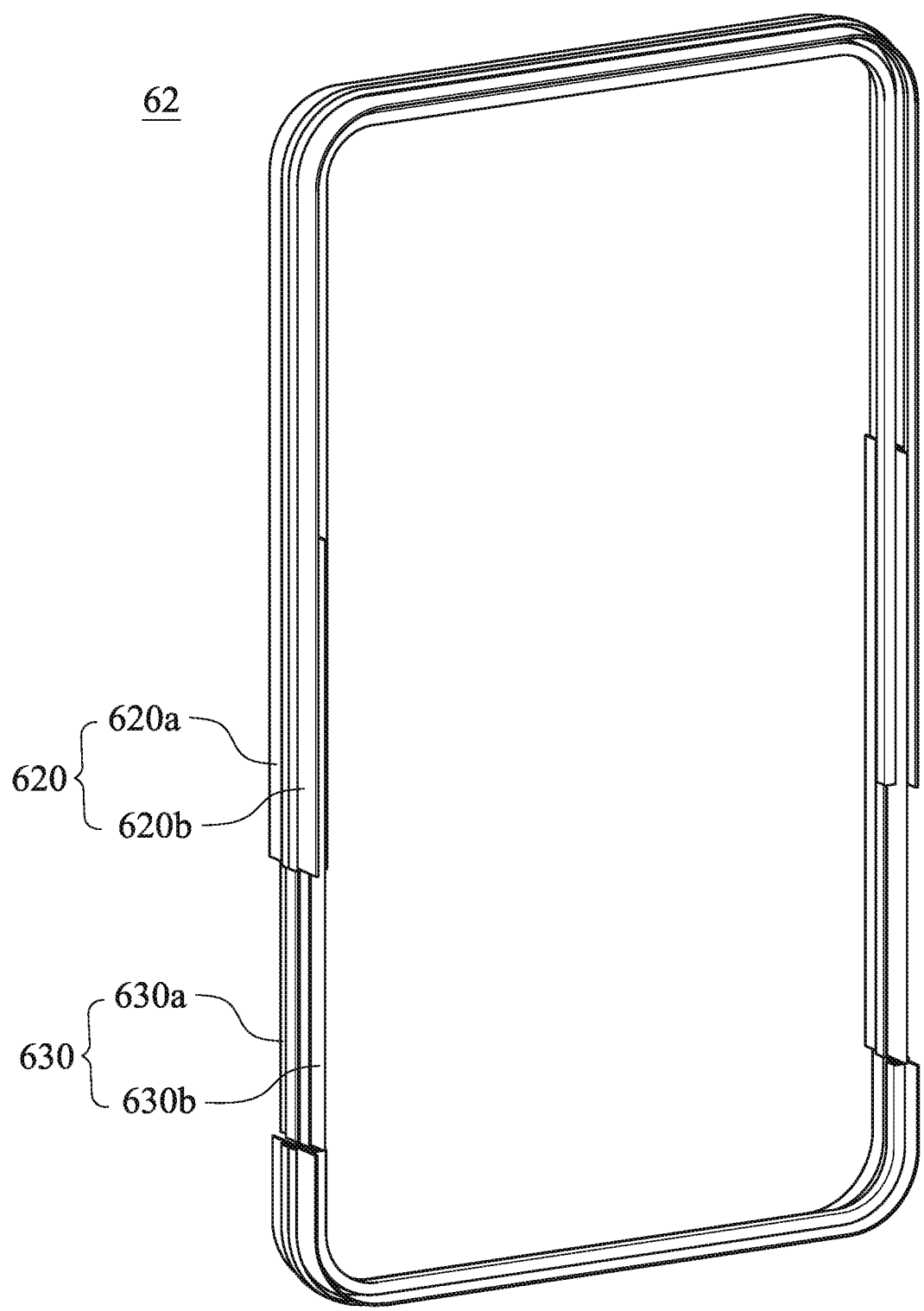
FIG. 33 is a schematic view of a second mode of the frame portion of the telescoping wheel box according to FIG. 30.

FIG. 30 is a schematic view of a telescoping wheel box 600 according to a nine embodiment of the present disclosure. FIG. 31 is a cross-sectional view of an outer frame portion 620 and an inner frame portion 630 of the telescoping wheel box 600 according to FIG. 30. FIG. 32 is a schematic view of a first mode of the frame portion of the telescoping wheel box 600 according to FIG. 30. FIG. 33 is a schematic view of a second mode of the frame portion of the telescoping wheel box 600 according to FIG. 30. In FIGS. 30-33, a number of the telescoping wheel assemblies 100 is 4. Each of the telescoping wheel assemblies 100 is disposed in the telescoping wheel box 600, and each of the buttons 140 is extended out of the telescoping wheel box 600. The telescoping wheel box 600 includes a first outer body 610a, a first inner body 640a, a second outer body 610b, a second inner body 640b and a frame portion 62. The first outer body 610a, the first inner body 640a, the second outer body 610b and the second inner body 640b are disposed in the frame portion 62, and the frame portion 62 includes an outer frame portion 620 and an inner frame portion 630.

The outer frame portion 620 includes a first outer frame 620a and a second outer frame 620b. The second outer frame 620b is detachably connected to the first outer frame 620a. The inner frame portion 630 is movably connected to the outer frame portion 620 and includes a first inner frame 630a and a second inner frame 630b. The first inner frame 630a is movably connected to the first outer frame 620a. The second inner frame 630b is movably connected to the second outer frame 620b. Therefore, the frame portion 62 is telescoped and includes a first mode and a second mode. In FIG. 32, the frame portion 62 is the first mode. In FIG. 33, the frame portion 62 is the second mode. Moreover, the first outer body 610a, the first inner body 640a, the second outer body 610b and the second inner body 640b are telescoped, so that an accommodating space of the telescoping wheel box 600 can be adjusted.

Please refer to FIG. 31, the first outer body 610a is disposed in the first outer frame 620a and connected to the telescoping wheel assembly 100. The first inner body 640a is disposed in the first inner frame 630a. The second outer body 610b is disposed in the second outer frame 620b and connected to the telescoping wheel assembly 100. The second inner body 640b is disposed in the second inner frame 630b. In some embodiments, the first outer frame 620a includes a first outer body slot 621a and a first inner frame slot 622a. The first inner frame 630a includes a first inner body slot 631a. The second outer frame 620b includes a second outer body slot 621b and a second inner frame slot 622b. The second inner frame 630b includes a second inner body slot 631b. The first outer body 610a is disposed in the first outer body slot 621a of the first outer frame 620a. The first inner frame 630a is disposed in the first inner frame slot 622a of the first outer frame 620a. The first inner body 640a is disposed in the first inner body slot 631a of the first inner frame 630a. The second outer body 610b is disposed in the second outer body slot 621b of the second outer frame 620b. The second inner frame 630b is disposed in the second inner frame slot 622b of the second outer frame 620b. The second inner body 640b is disposed in the second inner body slot 631b of the second inner frame 630b. Therefore, the first outer body 610a, the first inner body 640a, the second outer body 610b and the second inner body 640b can telescope with the frame portion 62 so as to adjust the accommodating space of the telescoping wheel box 600.

What is claimed is:

1. A telescoping wheel assembly, comprising:
   a base body, comprising:
     a receiving groove;
     at least one base body guiding slot communicated to the receiving groove, and the at least one base body guiding slot comprising a tapering portion;
     at least one adjusting slot disposed at one side of the tapering portion; and
     at least one deforming portion deformably disposed between the at least one adjusting slot and the at least one base body guiding slot; and
   a wheel set connected to the receiving groove, wherein the wheel set is selectively positioned at an outward position or an inward position relative to the receiving groove, and the wheel set comprises:
     a wheel axle comprising:
       an upper wheel axle comprising at least one extended positioning portion, wherein the at least one extended positioning portion is limited by the tapering portion so as to position the wheel set; and
       a lower wheel axle pivotally connected to the upper wheel axle and comprising at least one guiding portion abutted by the base body so as to guide the lower wheel axle; and a wheel body connected to an end portion of the wheel axle; and an elastic member disposed in the receiving groove and abutted against the base body and the wheel set, wherein when the wheel set is positioned at the outward position, the elastic member provides a buffering elastic force to the wheel set, and the lower wheel axle is pivotably protruded from the base body; and when the wheel set is positioned at the inward position, the elastic member provides a pushing elastic force to the wheel set, the lower wheel axle is received in the base body and no portion of the wheel axle is extended outside the receiving groove.

2. The telescoping wheel assembly of claim 1, wherein the at least one base body guiding slot comprises:
a fixing portion disposed at one end of the tapering portion, wherein when the at least one extended positioning portion is clasped to the fixing portion, the wheel set is positioned at the outward position.

3. The telescoping wheel assembly of claim 1, wherein the at least one extended positioning portion comprises:
a curving block extended into the at least one base body guiding slot.

4. The telescoping wheel assembly of claim 1, wherein, the at least one guiding portion comprises a curving edge; and
the base body further comprises:
an opening portion disposed at an outside of the receiving groove, wherein when the wheel set is adjusted from the outward position to the inward position, the curving edge of the at least one guiding portion is abutted by the opening portion so as to guide the lower wheel axle, and the wheel set is guided to a receiving direction and received into the base body.

5. The telescoping wheel assembly of claim 1, further comprising:
a button passing through the base body, wherein the button comprises a protruding status or an adducting status relative to the receiving groove, and the button comprises:
at least one first positioning unit; and
at least one second positioning unit disposed at one side of the at least one first positioning unit; and
an elastic unit disposed in the receiving groove and abutted against the button;
wherein the base body further comprises:
at least one first button positioning slot, wherein the at least one first positioning unit is movably disposed in the at least one first button positioning slot; and
at least one second button positioning slot disposed at one side of the at least one first button positioning slot, wherein the at least one second positioning unit is selectively disposed into the at least one second button positioning slot.

6. The telescoping wheel assembly of claim 5, wherein, the button further comprises:
an adjusting block, wherein when the adjusting block is pushed by the wheel set, the at least one second positioning unit is detached from the at least one second button positioning slot, and the elastic unit provides a pushing force to the button so as to adjust the button from the adducting status to the protruding status.

7. The telescoping wheel assembly of claim 5, further comprising:

a guiding axle member disposed in the receiving groove and passing through the upper wheel axle;
wherein the lower wheel axle comprises:
a guiding bevel face; and
a guiding hole disposed at the guiding bevel face, wherein when the wheel set is positioned at the inward position, the guiding axle member passes through the guiding hole.

8. The telescoping wheel assembly of claim 5, wherein:
the base body further comprises
an extending groove communicated to the receiving groove; and
the wheel set further comprises: an adjusting element disposed in the receiving groove, wherein the wheel axle is disposed on the adjusting element; and
wherein when the button is adjusted from the adducting status to the protruding status, the button is clasped to the extending groove; when the button is adjusted from the protruding status to the adducting status, the wheel set is adjusted from the outward position to the inward position by the at least one elastic member.

9. The telescoping wheel assembly of claim 8, wherein the base body further comprises:
a magnetic positioning element disposed in the extending groove, wherein the extending groove is configured to adjust the button from the adducting status to the protruding status so as to allow the button to be clasped to the extending groove.

10. The telescoping wheel assembly of claim 1, further comprising:
a button passing through the base body, wherein the button comprises a protruding status or an adducting status relative to the receiving groove, and the button comprises:
at least one first positioning unit; and
an elastic unit disposed in the receiving groove and abutted against the button;
wherein the base body further comprises:
at least one first button positioning slot, wherein the at least one first positioning unit is movably disposed in the at least one first button positioning slot; and
at least one delay element disposed at one side of the at least one first button positioning slot, wherein the at least one delay element is corresponding to the elastic unit so as to delay the button adjusting from the adducting status to the protruding status.

11. A telescoping wheel box, comprising:
the telescoping wheel assembly of claim 1;
a frame portion, comprising:
an outer frame portion, comprising:
a first outer frame; and
a second outer frame detachably connected to the first outer frame; and
an inner frame portion movably connected to the outer frame portion and comprising:
a first inner frame movably connected to the first outer frame; and
a second inner frame movably connected to the second outer frame;
a first outer body disposed in the first outer frame and connected to the telescoping wheel assembly;
a first inner body disposed in the first inner frame;
a second outer body disposed in the second outer frame and connected to the telescoping wheel assembly; and
a second inner body disposed in the second inner frame.

12. The telescoping wheel assembly of claim 1, when the wheel set is positioned at the inward position, at least a portion of the wheel body is placed in the receiving groove.

13. The telescoping wheel assembly of claim 1, when the wheel set is positioned at the inward position, a center of the wheel body is placed in the receiving groove.

* * * * *